(12) United States Patent
Mao et al.

(10) Patent No.: US 12,531,995 B2
(45) Date of Patent: Jan. 20, 2026

(54) ENCODING METHOD AND APPARATUS, DECODING METHOD AND APPARATUS, DEVICE, STORAGE MEDIUM, AND COMPUTER PROGRAM PRODUCT

(71) Applicant: Huawei Technologies Co., Ltd., Shenzhen (CN)

(72) Inventors: Jue Mao, Hangzhou (CN); Yin Zhao, Hangzhou (CN); Dequan Yu, Hangzhou (CN); Lian Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/828,541

(22) Filed: Sep. 9, 2024

(65) Prior Publication Data
US 2024/0430432 A1  Dec. 26, 2024

Related U.S. Application Data

(63) Continuation of application No. PCT/CN2023/079340, filed on Mar. 2, 2023.

(30) Foreign Application Priority Data

Mar. 10, 2022  (CN) .......................... 202210234190.8

(51) Int. Cl.
*H04N 19/136* (2014.01)
*H04N 19/124* (2014.01)
(Continued)

(52) U.S. Cl.
CPC ......... *H04N 19/136* (2014.11); *H04N 19/124* (2014.11); *H04N 19/146* (2014.11); *H04N 19/184* (2014.11); *H04N 19/42* (2014.11)

(58) Field of Classification Search
CPC .. H04N 19/136; H04N 19/124; H04N 19/146; H04N 19/184; H04N 19/42;
(Continued)

(56) References Cited

U.S. PATENT DOCUMENTS 11,178,409 B2 * 11/2021 Young .................. H04N 19/60
2003/0108099 A1 * 6/2003 Nagumo .................. G06T 9/20
375/E7.199
(Continued)

FOREIGN PATENT DOCUMENTS

CN  110602494 A  12/2019
CN  111641826 A   9/2020
(Continued)

OTHER PUBLICATIONS

Yadong Lu et al:"Progressive Neural Image Compression With Nested Quantization and Latent Ordering." arXiv:2102.02913v1 [cs.LG] Feb. 4, 2021. total 7 pages.
(Continued)

*Primary Examiner* — Joseph Suh
(74) *Attorney, Agent, or Firm* — Conley Rose, P.C.

(57) ABSTRACT

When probability estimation is performed in encoding and decoding processes, probability distribution of an unquantized image feature is estimated based on a hyperprior feature of the unquantized image feature via a first probability distribution estimation network, and then probability distribution of a quantized image feature is obtained through quantization. Alternatively, probability distribution of a quantized image feature is directly estimated based on a hyperprior feature of an unquantized image feature via a second probability distribution estimation network.

20 Claims, 13 Drawing Sheets

(51) Int. Cl.
*H04N 19/146* (2014.01)
*H04N 19/184* (2014.01)
*H04N 19/42* (2014.01)

(58) Field of Classification Search
CPC .... H04N 19/13; H04N 19/149; H04N 19/172; G06T 9/002; G06T 9/00
See application file for complete search history.

(56) References Cited

U.S. PATENT DOCUMENTS

| | | | |
|---|---|---|---|
| 2020/0160565 A1 | 5/2020 | Ma et al. | |
| 2020/0372684 A1 | 11/2020 | Wen et al. | |
| 2021/0218997 A1* | 7/2021 | Rezazadegan Tavakoli | H04N 19/176 |
| 2021/0327456 A1* | 10/2021 | Yamaguchi | G10L 25/30 |
| 2022/0103839 A1* | 3/2022 | Van Rozendaal | G06N 3/045 |
| 2022/0237740 A1 | 7/2022 | Lu et al. | |
| 2023/0262267 A1* | 8/2023 | Said | H04N 19/463 382/232 |
| 2024/0062507 A1* | 2/2024 | Beye | G06V 10/28 |

FOREIGN PATENT DOCUMENTS

| | | |
|---|---|---|
| CN | 111641832 A | 9/2020 |
| CN | 113313777 B | 12/2021 |
| CN | 114071141 A | 2/2022 |
| JP | 2024504315 A | 1/2024 |
| JP | 2025502448 A | 1/2025 |
| WO | 2013000575 A1 | 1/2013 |
| WO | 2021220008 A1 | 11/2021 |

OTHER PUBLICATIONS

Johannes Ball et al:"Variational Image Compression With a Scale Hyperprior." arXiv:1802.01436v2 [eess.IV] May 1, 2018. total 23 pages.

Series H: Audiovisual and Multimedia Systems, Infrastructure of audiovisual services—Transmission multiplexing and synchronization, Multiplexing protocol for low bit rate multimedia communication, Annex B: Multiplexing protocol for low bit rate multimedia mobile communication over moderate error-prone channels, ITU-T, H.223, Annex B, Feb. 1998, 13 pages.

* cited by examiner

ENCODING METHOD AND APPARATUS, DECODING METHOD AND APPARATUS, DEVICE, STORAGE MEDIUM, AND COMPUTER PROGRAM PRODUCT

CROSS-REFERENCE TO RELATED APPLICATIONS

This is a continuation of International Patent Application No. PCT/CN2023/079340 filed on Mar. 2, 2023, which claims priority to Chinese Patent Application No. 202210234190.8 filed on Mar. 10, 2022. The disclosures of the aforementioned applications are hereby incorporated by reference in their entireties.

TECHNICAL FIELD

This disclosure relates to the field of encoding and decoding technologies, and in particular, to an encoding method and apparatus, a decoding method and apparatus, a device, a storage medium, and a computer program product.

BACKGROUND

An image compression technology can implement effective transmission and storage of image information, and plays an important role in the current media era in which types and data volumes of image information are increasing. The image compression technology includes image encoding and decoding. Encoding and decoding performance reflects image quality, and is a key element that needs to be considered in the image compression technology.

In an encoding process in a related technology, an image feature y of an image is extracted via an image feature extraction network, and the image feature y is quantized based on a quantization step q to obtain an image feature ys. The image feature ys is input into a hyper encoder network to determine a hyperprior feature zs, and the hyperprior feature zs is encoded into a bitstream through entropy encoding. Entropy decoding is performed on the hyperprior feature zs in the bitstream to obtain a hyperprior feature zs', and a probability distribution parameter of the image feature ys is obtained based on the hyperprior feature zs' via a probability distribution estimation network. Based on the probability distribution parameter of the image feature ys, the image feature ys is encoded into the bitstream through entropy encoding. A decoding process is symmetrical to the encoding process. Most of image compression is implemented through a quantization operation, and the quantization operation has a great impact on encoding and decoding performance.

However, quantization operations in encoding and decoding processes need to match a bit rate. In a multi-bit-rate scenario, to match different bit rates, different quantization steps usually need to be used in the encoding and decoding processes. However, the different quantization steps cause a significant difference in numerical ranges of image features ys obtained through quantization. To obtain, through training, a probability distribution estimation network for estimating probability distribution parameters of image features ys at different bit rates, the probability distribution estimation network needs to obtained through training by using image features ys in different numerical ranges. However, the numerical range of the image feature ys varies greatly at different bit rates, training on the probability distribution estimation network is difficult and unstable, and it is difficult to obtain a probability distribution estimation network with good performance through training. Consequently, encoding and decoding performance is affected.

SUMMARY

Embodiments of this disclosure provide an encoding method and apparatus, a decoding method and apparatus, a device, a storage medium, and a computer program product. In a multi-bit-rate scenario, training on a probability distribution estimation network can be simplified, so that network training is stable, and a network with good performance is obtained through training, thereby improving encoding and decoding performance.

According to a first aspect, this disclosure provides an encoding method, including: determining a first image feature and a second image feature of a to-be-encoded image, where the first image feature is an image feature obtained by quantizing the second image feature based on a first quantization step; determining a first hyperprior feature of the second image feature; encoding the first hyperprior feature into a bitstream; determining a first probability distribution parameter based on the first hyperprior feature via a probability distribution estimation network; quantizing the first probability distribution parameter based on the first quantization step to obtain a second probability distribution parameter; and encoding the first image feature into the bitstream based on the second probability distribution parameter.

It can be learned that when probability estimation is performed in an encoding process, probability distribution of an unquantized image feature is estimated based on a hyperprior feature of the unquantized image feature via the probability distribution estimation network, and then probability distribution of a quantized image feature is obtained through quantization. Even in a multi-bit-rate scenario, a numerical range of the unquantized image feature is not affected by a quantization step and is stable. Therefore, training on the probability distribution estimation network by using the unquantized image feature is less difficult and stable, and a network with good performance can be obtained through training. This helps improve encoding and decoding performance.

Optionally, the determining a first hyperprior feature of the second image feature includes: inputting the second image feature into a hyper encoder network to obtain the first hyperprior feature. That is, an encoder side inputs an unquantized image feature into the hyper encoder network to obtain a first hyperprior feature of the unquantized image feature.

Optionally, the determining a first hyperprior feature of the second image feature includes: inversely quantizing the first image feature based on the first quantization step to obtain a third image feature of the image; and inputting the third image feature into a hyper encoder network to obtain the first hyperprior feature. That is, an encoder side inputs an inversely quantized image feature into the hyper encoder network, and an obtained first hyperprior feature of the inversely quantized image feature is considered as a first hyperprior feature of an unquantized image feature.

Optionally, the determining a first probability distribution parameter based on the first hyperprior feature via a probability distribution estimation network includes: inputting the third image feature of the image into a context network to obtain a context feature of the third image feature, where the third image feature is an image feature obtained by inversely quantizing the first image feature based on the first quantization step; determining a first prior feature based on the first hyperprior feature; and inputting the first prior feature and the context feature into the probability distribution estimation network to obtain the first probability distribution parameter. That is, the encoder side extracts a context feature from the inversely quantized image feature to determine a first probability distribution parameter based on the context feature and a first prior feature. This helps improve accuracy of probability estimation.

Optionally, the determining a first probability distribution parameter based on the first hyperprior feature via a probability distribution estimation network includes: inputting the first image feature into a context network to obtain a context feature of the first image feature; determining a first prior feature based on the first hyperprior feature; quantizing the first prior feature based on a second quantization step to obtain a second prior feature; and inputting the second prior feature and the context feature into the probability distribution estimation network to obtain the first probability distribution parameter. That is, the encoder side may alternatively extract a context feature from an inversely quantized image feature, and then obtain a second prior feature by adding a quantization operation on a first prior feature, to determine a first probability distribution parameter based on the second prior feature and the context feature. This can also improve accuracy of probability estimation to some extent.

Optionally, the first quantization step is obtained based on a bit rate of the image via a gain network, and the gain network is used to determine quantization steps respectively corresponding to a plurality of types of bit rates. That is, a quantization step is obtained through network learning, and the quantization step can better match a bit rate. This helps improve encoding and decoding performance.

According to a second aspect, a decoding method is provided. The method includes: parsing a bitstream to obtain a first hyperprior feature of a to-be-decoded image; determining a first probability distribution parameter based on the first hyperprior feature via a probability distribution estimation network, where the first probability distribution parameter represents probability distribution of an unquantized image feature of the image; quantizing the first probability distribution parameter based on a first quantization step to obtain a second probability distribution parameter; parsing the bitstream based on the second probability distribution parameter to obtain a first image feature of the image; and inversely quantizing the first image feature based on the first quantization step to reconstruct the image.

It can be learned that when probability estimation is performed in a decoding process, probability distribution of an unquantized image feature is estimated based on a hyperprior feature of the unquantized image feature via the probability distribution estimation network, and then probability distribution of a quantized image feature is obtained through quantization. Even in a multi-bit-rate scenario, a numerical range of the unquantized image feature is not affected by a quantization step and is stable. Therefore, training on the probability distribution estimation network by using the unquantized image feature is less difficult and stable, and a network with good performance can be obtained through training. This helps improve encoding and decoding performance.

Optionally, the first image feature is an image feature obtained by quantizing a second image feature of the image based on the first quantization step.

Optionally, the inversely quantizing the first image feature based on the first quantization step to reconstruct the image includes: inversely quantizing the first image feature based on the first quantization step to obtain a third image feature of the image; and reconstructing the image based on the third image feature.

Optionally, the first probability distribution parameter includes probability distribution parameters of a plurality of feature points, and the first hyperprior feature includes hyperprior features of the plurality of feature points. The determining a first probability distribution parameter based on the first hyperprior feature via a probability distribution estimation network includes: performing the following operations on a first feature point to determine a probability distribution parameter of the first feature point, where the first feature point is any one of the plurality of feature points: determining a context feature of the first feature point based on image features of decoded feature points in the first image feature; determining a first prior feature of the first feature point based on a hyperprior feature of the first feature point; and determining the probability distribution parameter of the first feature point based on the first prior feature of the first feature point and the context feature of the first feature point via the probability distribution estimation network, that is, determining the probability distribution parameter of the first feature point in the first probability distribution parameter. That is, the probability distribution is estimated based on the context feature. This helps improve accuracy of probability estimation.

Optionally, the determining a context feature of the first feature point based on image features of decoded feature points in the first image feature includes: determining a surrounding feature point of the first feature point from the decoded feature points; inversely quantizing an image feature of the surrounding feature point in the first image feature based on the first quantization step to obtain a surrounding feature of the first feature point; and inputting the surrounding feature of the first feature point into a context network to obtain the context feature of the first feature point. The determining the probability distribution parameter of the first feature point based on the first prior feature of the first feature point and the context feature of the first feature point via the probability distribution estimation network includes: inputting the first prior feature of the first feature point and the context feature of the first feature point into the probability distribution estimation network to obtain the probability distribution parameter of the first feature point. That is, a decoder side extracts a context feature from an inversely quantized image feature to determine a first probability distribution parameter based on the context feature and a first prior feature.

Optionally, the determining a context feature of the first feature point based on image features of decoded feature points in the first image feature includes: determining a surrounding feature point of the first feature point from the decoded feature points; and inputting an image feature of the surrounding feature point in the first image feature into a context network to obtain the context feature of the first feature point. The determining the probability distribution parameter of the first feature point based on the first prior feature of the first feature point and the context feature of the first feature point via the probability distribution estimation network includes: quantizing the first prior feature of the first feature point based on a second quantization step to obtain a second prior feature of the first feature point; and inputting the second prior feature of the first feature point and the context feature of the first feature point into the probability distribution estimation network to obtain the probability distribution parameter of the first feature point. That is, a decoder side extracts a context feature from a quantized image feature, and then obtains a second prior feature by adding a quantization operation on a first prior feature, to determine a first probability distribution parameter based on the second prior feature and the context feature.

According to a third aspect, an encoding method is provided. The method includes: determining a first image feature and a second image feature of a to-be-encoded image, where the first image feature is an image feature obtained by quantizing the second image feature based on a first quantization step; determining a first hyperprior feature of the second image feature; encoding the first hyperprior feature into a bitstream; determining a second probability distribution parameter based on the first hyperprior feature via a second probability distribution estimation network, where a network parameter of the second probability distribution estimation network is obtained based on a network parameter of a first probability distribution estimation network and the first quantization step, and the first probability distribution estimation network is used to determine probability distribution of an unquantized image feature; and encoding the first image feature into the bitstream based on the second probability distribution parameter.

It can be learned that, in an encoding process, a hyperprior feature of the unquantized image feature is also determined, but the second probability distribution parameter is directly obtained subsequently via the second probability distribution estimation network. The second probability distribution estimation network is obtained by processing the network parameter in the first probability distribution estimation network based on the first quantization step. It can be learned that only the first probability distribution estimation network needs to be obtained through training in this solution. Even in a multi-bit-rate scenario, a numerical range of the unquantized image feature is stable and is not affected by a quantization step. Therefore, training on the first probability distribution estimation network is less difficult and stable, and the first probability distribution estimation network with good performance can be obtained through training. This helps improve encoding and decoding performance.

Optionally, the first probability distribution estimation network is the probability distribution estimation network in the first aspect or the second aspect.

Optionally, the second probability distribution estimation network is obtained by multiplying a network parameter of a last layer in the first probability distribution estimation network by the first quantization step.

Optionally, the last layer in the first probability distribution estimation network is a convolutional layer, and network parameters of the convolutional layer include a weight and an offset.

Optionally, the determining a first hyperprior feature of the second image feature includes: inputting the second image feature into a hyper encoder network to obtain the first hyperprior feature. That is, an encoder side inputs the unquantized image feature into the hyper encoder network to obtain a first hyperprior feature of the unquantized image feature.

Optionally, the determining a first hyperprior feature of the second image feature includes: inversely quantizing the first image feature based on the first quantization step to obtain a third image feature of the image; and inputting the third image feature into a hyper encoder network to obtain the first hyperprior feature. That is, an encoder side inputs an inversely quantized image feature into the hyper encoder network, and an obtained first hyperprior feature of the inversely quantized image feature is considered as a first hyperprior feature of the unquantized image feature.

Optionally, the determining a second probability distribution parameter based on the first hyperprior feature via a second probability distribution estimation network includes: inputting the third image feature of the image into a context network to obtain a context feature of the third image feature, where the third image feature is an image feature obtained by inversely quantizing the first image feature based on the first quantization step; determining a first prior feature based on the first hyperprior feature; and inputting the first prior feature and the context feature into the second probability distribution estimation network to obtain the second probability distribution parameter. That is, the encoder side extracts a context feature from the inversely quantized image feature to determine a first probability distribution parameter based on the context feature and a first prior feature. This helps improve accuracy of probability estimation.

Optionally, the determining a second probability distribution parameter based on the first hyperprior feature via a second probability distribution estimation network includes: inputting the first image feature into a context network to obtain a context feature of the first image feature; determining a first prior feature based on the first hyperprior feature; quantizing the first prior feature based on a second quantization step to obtain a second prior feature; and inputting the second prior feature and the context feature into the second probability distribution estimation network to obtain the second probability distribution parameter. That is, the encoder side may alternatively extract a context feature from an inversely quantized image feature, and then obtain a second prior feature by adding a quantization operation on a first prior feature, to determine a first probability distribution parameter based on the second prior feature and the context feature. This can also improve accuracy of probability estimation to some extent.

According to a fourth aspect, a decoding method is provided. The method includes: parsing a bitstream to obtain a first hyperprior feature of a to-be-decoded image; determining a second probability distribution parameter based on the first hyperprior feature via a second probability distribution estimation network, where a network parameter of the second probability distribution estimation network is obtained based on a network parameter of a first probability distribution estimation network and a first quantization step, and the first probability distribution estimation network is used to determine probability distribution of an unquantized image feature; parsing the bitstream based on the second probability distribution parameter to obtain a first image feature of the image; and inversely quantizing the first image feature based on the first quantization step to reconstruct the image.

It can be learned that in a decoding process, the second probability distribution parameter is directly obtained via the second probability distribution estimation network, and the second probability distribution estimation network is obtained by processing the network parameter in the first probability distribution estimation network based on the first quantization step. Only the first probability distribution estimation network needs to be obtained through training in this solution. Even in a multi-bit-rate scenario, a numerical range of the unquantized image feature is stable and is not affected by a quantization step, in other words, an input numerical range of the first probability distribution estimation network does not change with a bit rate. Therefore, training on the first probability distribution estimation network is less difficult and stable, and the first probability distribution estimation network with good performance can be obtained through training. This helps improve encoding and decoding performance.

Optionally, the first probability distribution estimation network is the probability distribution estimation network in the first aspect or the second aspect.

Optionally, the second probability distribution estimation network is obtained by multiplying a network parameter of a last layer in the first probability distribution estimation network by the first quantization step.

Optionally, the last layer in the first probability distribution estimation network is a convolutional layer, and network parameters of the convolutional layer include a weight and an offset.

Optionally, the first image feature is an image feature obtained by quantizing a second image feature of the image based on the first quantization step.

Optionally, the inversely quantizing the first image feature based on the first quantization step to reconstruct the image includes: inversely quantizing the first image feature based on the first quantization step to obtain a third image feature of the image; and reconstructing the image based on the third image feature.

Optionally, the second probability distribution parameter includes probability distribution parameters of a plurality of feature points, and the first hyperprior feature includes hyperprior features of the plurality of feature points. The determining a second probability distribution parameter based on the first hyperprior feature via a second probability distribution estimation network includes: performing the following operations on a first feature point to determine a probability distribution parameter of the first feature point, where the first feature point is any one of the plurality of feature points: determining a context feature of the first feature point based on image features of decoded feature points in the first image feature; determining a first prior feature of the first feature point based on a hyperprior feature of the first feature point; and determining the probability distribution parameter of the first feature point based on the first prior feature of the first feature point and the context feature of the first feature point via the second probability distribution estimation network, that is, determining the probability distribution parameter of the first feature point in the second probability distribution parameter. That is, the probability distribution is estimated based on the context feature. This helps improve accuracy of probability estimation.

Optionally, the determining a context feature of the first feature point based on image features of decoded feature points in the first image feature includes: determining a surrounding feature point of the first feature point from the decoded feature points; inversely quantizing an image feature of the surrounding feature point in the first image feature based on the first quantization step to obtain a surrounding feature of the first feature point; and inputting the surrounding feature of the first feature point into a context network to obtain the context feature of the first feature point. The determining the probability distribution parameter of the first feature point based on the first prior feature of the first feature point and the context feature of the first feature point via the second probability distribution estimation network includes: inputting the first prior feature of the first feature point and the context feature of the first feature point into the second probability distribution estimation network to obtain the probability distribution parameter of the first feature point. That is, a decoder side extracts a context feature from an inversely quantized image feature to determine a second probability distribution parameter based on the context feature and a first prior feature.

Optionally, the determining a context feature of the first feature point based on image features of decoded feature points in the first image feature includes: determining a surrounding feature point of the first feature point from the decoded feature points; and inputting an image feature of the surrounding feature point in the first image feature into a context network to obtain the context feature of the first feature point. The determining the probability distribution parameter of the first feature point based on the first prior feature of the first feature point and the context feature of the first feature point via the second probability distribution estimation network includes: quantizing the first prior feature of the first feature point based on a second quantization step to obtain a second prior feature of the first feature point; and inputting the second prior feature of the first feature point and the context feature of the first feature point into the second probability distribution estimation network to obtain the probability distribution parameter of the first feature point. That is, a decoder side extracts the context feature from a quantized image feature, and then obtains a second prior feature by adding a quantization operation on a first prior feature, to determine a second probability distribution parameter based on the second prior feature and the context feature.

According to a fifth aspect, an encoding apparatus is provided. The encoding apparatus has a function of implementing behavior of the encoding method in the first aspect. The encoding apparatus includes one or more modules, and the one or more modules are configured to implement the encoding method provided in the first aspect.

That is, an encoding apparatus is provided. The apparatus includes: a first determining module, configured to determine a first image feature and a second image feature of a to-be-encoded image, where the first image feature is an image feature obtained by quantizing the second image feature based on a first quantization step; a second determining module, configured to determine a first hyperprior feature of the second image feature; a first encoding module, configured to encode the first hyperprior feature into a bitstream; a probability estimation module, configured to determine a first probability distribution parameter based on the first hyperprior feature via a probability distribution estimation network; a quantization module, configured to quantize the first probability distribution parameter based on the first quantization step to obtain a second probability distribution parameter; and a second encoding module, configured to encode the first image feature into the bitstream based on the second probability distribution parameter.

Optionally, the second determining module includes: a first hyper encoder submodule, configured to input the second image feature into a hyper encoder network to obtain the first hyperprior feature.

Optionally, the second determining module includes: an inverse quantization submodule, configured to inversely quantize the first image feature based on the first quantization step to obtain a third image feature of the image; and a second hyper encoder submodule, configured to input the third image feature into a hyper encoder network to obtain the first hyperprior feature.

Optionally, the probability estimation module includes: a context submodule, configured to input the third image feature of the image into a context network to obtain a context feature of the third image feature, where the third image feature is an image feature obtained by inversely quantizing the first image feature based on the first quantization step; a first determining submodule, configured to determine a first prior feature based on the first hyperprior feature; and a first probability estimation submodule, configured to input the first prior feature and the context feature into the probability distribution estimation network to obtain the first probability distribution parameter.

Optionally, the probability estimation module includes: a context submodule, configured to input the first image feature into a context network to obtain a context feature of the first image feature; a second determining submodule, configured to determine a first prior feature based on the first hyperprior feature; a quantization submodule, configured to quantize the first prior feature based on a second quantization step to obtain a second prior feature; and a second probability estimation submodule, configured to input the second prior feature and the context feature into the probability distribution estimation network to obtain the first probability distribution parameter.

According to a sixth aspect, a decoding apparatus is provided. The decoding apparatus has a function of implementing behavior of the decoding method in the second aspect. The decoding apparatus includes one or more modules, and the one or more modules are configured to implement the decoding method provided in the second aspect.

That is, a decoding apparatus is provided. The apparatus includes: a first parsing module, configured to parse a bitstream to obtain a first hyperprior feature of a to-be-decoded image; a probability estimation module, configured to determine a first probability distribution parameter based on the first hyperprior feature via a probability distribution estimation network, where the first probability distribution parameter represents probability distribution of an unquantized image feature of the image; a quantization module, configured to quantize the first probability distribution parameter based on a first quantization step to obtain a second probability distribution parameter; a second parsing module, configured to parse the bitstream based on the second probability distribution parameter to obtain a first image feature of the image; and a reconstruction module, configured to inversely quantize the first image feature based on the first quantization step to reconstruct the image.

Optionally, the first image feature is an image feature obtained by quantizing a second image feature of the image based on the first quantization step.

Optionally, the reconstruction module includes: an inverse quantization submodule, configured to inversely quantize the first image feature based on the first quantization step to obtain a third image feature of the image; and a reconstruction submodule, configured to reconstruct the image based on the third image feature.

Optionally, the first probability distribution parameter includes probability distribution parameters of a plurality of feature points, and the first hyperprior feature includes hyperprior features of the plurality of feature points. The probability estimation module includes a context submodule, a first determining submodule, and a probability estimation submodule.

For a first feature point, a probability distribution parameter of the first feature point is determined via the context submodule, the first determining submodule, and the probability estimation submodule, where the first feature point is any one of the plurality of feature points.

The context submodule is configured to determine a context feature of the first feature point based on image features of decoded feature points in the first image feature.

The first determining submodule is configured to determine a first prior feature of the first feature point based on a hyperprior feature of the first feature point.

The probability estimation submodule is configured to determine the probability distribution parameter of the first feature point based on the first prior feature of the first feature point and the context feature of the first feature point via the probability distribution estimation network.

Optionally, the context submodule is configured to: determine a surrounding feature point of the first feature point from the decoded feature points; inversely quantize an image feature of the surrounding feature point in the first image feature based on the first quantization step to obtain a surrounding feature of the first feature point; and input the surrounding feature of the first feature point into a context network to obtain the context feature of the first feature point; and determining the probability distribution parameter of the first feature point based on the first prior feature of the first feature point and the context feature of the first feature point via the probability distribution estimation network includes: inputting the first prior feature of the first feature point and the context feature of the first feature point into the probability distribution estimation network to obtain the probability distribution parameter of the first feature point.

Optionally, the context submodule is configured to: determine a surrounding feature point of the first feature point from the decoded feature points; input an image feature of the surrounding feature point in the first image feature into a context network to obtain the context feature of the first feature point; and determining the probability distribution parameter of the first feature point based on the first prior feature of the first feature point and the context feature of the first feature point via the probability distribution estimation network includes: quantizing the first prior feature of the first feature point based on a second quantization step to obtain a second prior feature of the first feature point; and inputting the second prior feature of the first feature point and the context feature of the first feature point into the probability distribution estimation network to obtain the probability distribution parameter of the first feature point.

According to a seventh aspect, an encoding apparatus is provided. The encoding apparatus has a function of implementing behavior of the encoding method in the third aspect. The encoding apparatus includes one or more modules, and the one or more modules are configured to implement the encoding method provided in the third aspect.

That is, an encoding apparatus is provided. The apparatus includes: a first determining module, configured to determine a first image feature and a second image feature of a to-be-encoded image, where the first image feature is an image feature obtained by quantizing the second image feature based on a first quantization step; a second determining module, configured to determine a first hyperprior feature of the second image feature; a first encoding module, configured to encode the first hyperprior feature into a bitstream; a probability estimation module, configured to determine a second probability distribution parameter based on the first hyperprior feature via a second probability distribution estimation network, where a network parameter of the second probability distribution estimation network is obtained based on a network parameter of a first probability distribution estimation network and the first quantization step, and the first probability distribution estimation network is used to determine probability distribution of an unquantized image feature; and a second encoding module, configured to encode the first image feature into the bitstream based on the second probability distribution parameter.

Optionally, the second probability distribution estimation network is obtained by multiplying a network parameter of a last layer in the first probability distribution estimation network by the first quantization step.

Optionally, the last layer in the first probability distribution estimation network is a convolutional layer, and network parameters of the convolutional layer include a weight and an offset.

Optionally, the second determining module includes: a first hyper encoder submodule, configured to input the second image feature into a hyper encoder network to obtain the first hyperprior feature.

Optionally, the second determining module includes: an inverse quantization submodule, configured to inversely quantize the first image feature based on the first quantization step to obtain a third image feature of the image; and a second hyper encoder submodule, configured to input the third image feature into a hyper encoder network to obtain the first hyperprior feature.

According to an eighth aspect, a decoding apparatus is provided. The decoding apparatus has a function of implementing behavior of the decoding method in the fourth aspect. The decoding apparatus includes one or more modules, and the one or more modules are configured to implement the decoding method provided in the fourth aspect.

That is, a decoding apparatus is provided. The apparatus includes: a first parsing module, configured to parse a bitstream to obtain a first hyperprior feature of a to-be-decoded image; a probability estimation module, configured to determine a second probability distribution parameter based on the first hyperprior feature via a second probability distribution estimation network, where a network parameter of the second probability distribution estimation network is obtained based on a network parameter of a first probability distribution estimation network and a first quantization step, and the first probability distribution estimation network is used to determine probability distribution of an unquantized image feature; a second parsing module, configured to parse the bitstream based on the second probability distribution parameter to obtain a first image feature of the image; and a reconstruction module, configured to inversely quantize the first image feature based on the first quantization step to reconstruct the image.

Optionally, the second probability distribution estimation network is obtained by multiplying a network parameter of a last layer in the first probability distribution estimation network by the first quantization step.

Optionally, the last layer in the first probability distribution estimation network is a convolutional layer, and network parameters of the convolutional layer include a weight and an offset.

Optionally, the first image feature is an image feature obtained by quantizing a second image feature of the image based on the first quantization step.

Optionally, the reconstruction module includes: an inverse quantization submodule, configured to inversely quantize the first image feature based on the first quantization step to obtain a third image feature of the image; and a reconstruction submodule, configured to reconstruct the image based on the third image feature.

According to a ninth aspect, an encoder-side device is provided. The encoder-side device includes a processor and a memory. The memory is configured to store a program for performing the encoding method provided in the first aspect and/or the third aspect, and store data for implementing the encoding method provided in the first aspect and/or the third aspect. The processor is configured to execute the program stored in the memory. The encoder-side device may further include a communication bus, and the communication bus is configured to establish a connection between the processor and the memory.

According to a tenth aspect, a decoder-side device is provided. The decoder-side device includes a processor and a memory. The memory is configured to store a program for performing the decoding method provided in the second aspect and/or the fourth aspect, and store data for implementing the decoding method provided in the second aspect and/or the fourth aspect. The processor is configured to execute the program stored in the memory. The decoder-side device may further include a communication bus, and the communication bus is configured to establish a connection between the processor and the memory.

According to an eleventh aspect, a computer-readable storage medium is provided. The computer-readable storage medium stores instructions. When the instructions are run on a computer, the computer is enabled to perform the encoding method according to the first aspect or the third aspect, or perform the decoding method according to the second aspect or the fourth aspect.

According to a twelfth aspect, a computer program product including instructions is provided. When the computer program product runs on a computer, the computer is enabled to perform the encoding method according to the first aspect or the third aspect, or perform the decoding method according to the second aspect or the fourth aspect.

Technical effects obtained in the fifth aspect to the twelfth aspect are similar to technical effects obtained through corresponding technical means in the first aspect to the fourth aspect. Details are not described herein again.

The technical solutions provided in this disclosure can bring at least the following beneficial effects:

To obtain a probability distribution parameter of the quantized image feature, in an encoding process of a solution, a first probability distribution parameter is determined based on the hyperprior feature of the unquantized image feature via the probability distribution estimation network, where the first probability distribution parameter represents the probability distribution of the unquantized image feature. Then, the first probability distribution parameter is quantized based on the first quantization step (that is, a quantization step for quantizing an image feature), to obtain a second probability distribution parameter for representing probability distribution of the quantized image feature. In an encoding process of another solution, the hyperprior feature of the unquantized image feature is also determined, but a second probability distribution parameter is directly obtained subsequently via the second probability distribution estimation network. The second probability distribution estimation network is obtained by processing the network parameter in the first probability distribution estimation network based on the first quantization step, and the first probability distribution network parameter is the probability distribution estimation network in the first solution. A decoding process is symmetrical to the encoding process. It can be learned that only the first probability distribution estimation network (for determining a probability distribution parameter of the unquantized image feature) needs to be obtained through training in the two solutions. Even in the multi-bit-rate scenario, the numerical range of the unquantized image feature is stable and is not affected by the quantization step, in other words, the input numerical range of the first probability distribution estimation network does not change with the bit rate. Therefore, training on the first probability distribution estimation network is less difficult and stable, and the first probability distribution estimation network with good performance can be obtained through training. This helps improve encoding and decoding performance.

DESCRIPTION OF EMBODIMENTS

Figure 1:
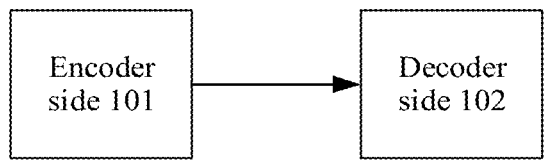
FIG. 1 is a diagram of an implementation environment according to an embodiment of this disclosure.

To make the objectives, technical solutions, and advantages of this disclosure clearer, the following further describes the implementations of this disclosure in detail with reference to accompanying drawings.

A system architecture and a service scenario that are described in embodiments of this disclosure are intended to describe the technical solutions in embodiments of this disclosure more clearly, and do not constitute a limitation on the technical solutions provided in embodiments of this disclosure. A person of ordinary skill in the art may be aware that: with evolution of the system architecture and emergence of new service scenarios, the technical solutions provided in embodiments of this disclosure are also applicable to similar technical problems.

Before an encoding and decoding method provided in embodiments of this disclosure is described in detail, terms and implementation environments in embodiments of this disclosure are first described.

For ease of understanding, the terms in embodiments of this disclosure are first described.

Bit rate: In image compression, a bit rate is a code length required for coding a pixel. A higher bit rate indicates better image reconstruction quality.

Convolutional neural network (CNN): A CNN is a feed-forward neural network that includes a convolutional operation and has a deep structure, and is one of representative algorithms of deep learning. The CNN includes a convolutional layer, and may further include activation layers (for example, a rectified linear unit (ReLU) and a parametric ReLU (PReLU)), a pooling layer, a batch normalization (BN) layer, a fully connected layer, and the like. Typical CNNs are, for example, LeNet, AlexNet, VGGNet, and ResNet. A basic CNN may include a backbone network and a head network. A complex CNN may include a backbone network, a neck network, and a head network.

Feature map: A feature map is three-dimensional data output by the convolutional layer, activation layer, pooling layer, and batch normalization layer in the CNN. Three dimensions are referred to as a width, a height, and a channel, respectively. One feature map includes image features of a plurality of feature points.

Backbone network: A backbone network is a first part of the CNN, and is used to extract feature maps of a plurality of scales from an input image. Generally, the backbone network includes the convolutional layer, the pooling layer, the activation layers, and the like, and does not include the fully connected layer. Generally, a feature map output by a layer close to the input image in the backbone network has high resolution (a width and a height) but a small quantity of channels. Typical backbone networks include, for example, VGG-16, ResNet-50, and ResNeXt-101.

Head network: Ahead network is a last part of the CNN, and is used to process a feature map to obtain a prediction result output by the neural network. A common head network includes a fully connected layer, a softmax module, and the like.

Neck network: A neck network is a middle part of the CNN, and is used to further integrate feature maps generated by the head network to obtain a new feature map. A common network is, for example, a feature pyramid network (FPN) in a faster region-convolutional neural network (faster region-CNN or faster R-CNN).

The following describes the implementation environments in embodiments of this disclosure.

FIG. 1 is a diagram of an implementation environment according to an embodiment of this disclosure. Refer to FIG. 1. The implementation environment includes an encoder side 101 and a decoder side 102. The encoder side 101 is used to compress an image according to the encoding method provided in embodiments of this disclosure, and the decoder side 102 is used to decode the image according to the decoding method provided in embodiments of this disclosure. Optionally, the encoder side 101 includes an encoder, and the encoder is configured to compress the image. The decoder side 102 includes a decoder, and the decoder is configured to decode the image. When the encoder side 101 and the decoder side 102 are located in a same device, the encoder side 101 communicates with the decoder side 102 through a device internal connection line or a network. When the encoder side 101 and the decoder side 102 are located in different devices, the encoder side 101 communicates with the decoder side 102 through an external connection line or via a wireless network. The encoder side 101 may also be referred to as a source apparatus, and the decoder side 102 may also be referred to as a destination apparatus.

Figure 2:
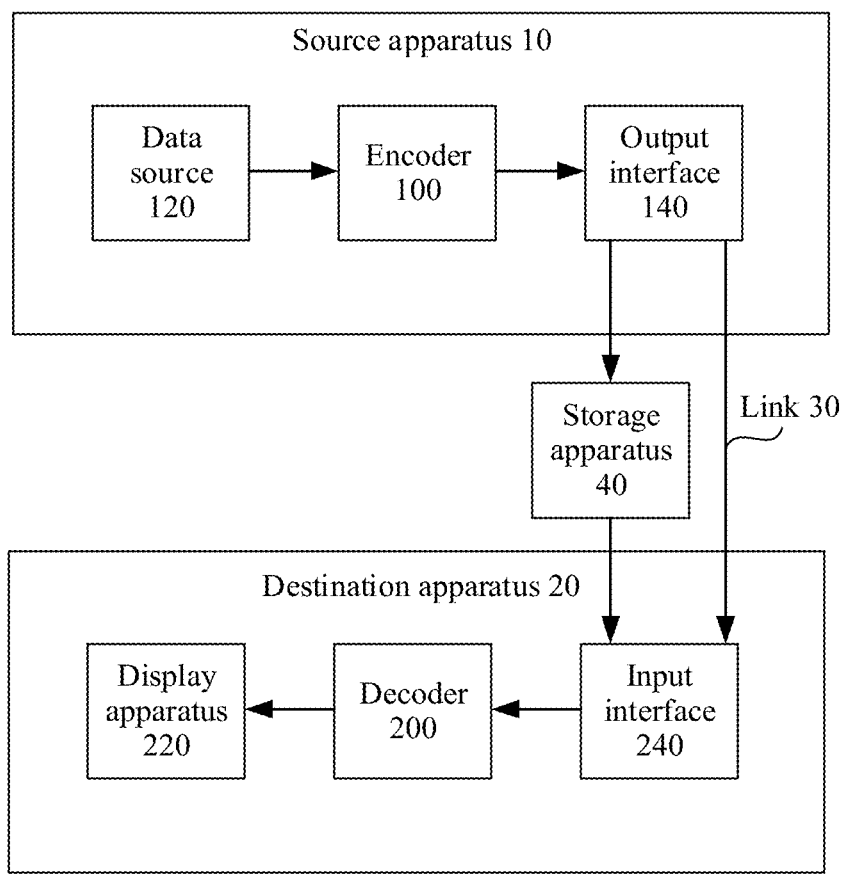
FIG. 2 is a diagram of another implementation environment according to an embodiment of this disclosure.

FIG. 2 is a diagram of another implementation environment according to an embodiment of this disclosure. Refer to FIG. 2. The implementation environment includes a source apparatus 10, a destination apparatus 20, a link 30, and a storage apparatus 40. The source apparatus 10 may generate an encoded image. Therefore, the source apparatus 10 may also be referred to as an image encoding apparatus or an encoder side. The destination apparatus 20 may decode the encoded image generated by the source apparatus 10. Therefore, the destination apparatus 20 may also be referred to as an image decoding apparatus or a decoder side. The link 30 may receive the encoded image generated by the source apparatus 10, and may transmit the encoded image to the destination apparatus 20. The storage apparatus 40 may receive the encoded image generated by the source apparatus 10, and may store the encoded image. In this case, the destination apparatus 20 may directly obtain the encoded image from the storage apparatus 40. Alternatively, the storage apparatus 40 may correspond to a file server or another intermediate storage apparatus that can store the encoded image generated by the source apparatus 10. In this case, the destination apparatus 20 may transmit, in a streaming manner, or download the encoded image stored on the storage apparatus 40.

Each of the source apparatus 10 and the destination apparatus 20 may include one or more processors and a memory coupled to the one or more processors. The memory may include a random-access memory (RAM), a read-only memory (ROM), an electrically erasable programmable read-only memory (EEPROM), a flash memory, any other medium that can be used to store required program code in a form of instructions or data structures and that is accessible to a computer, or the like. For example, each of the source apparatus 10 and the destination apparatus 20 may include a mobile phone, a smartphone, a personal digital assistant (PDA), a wearable device, a pocket personal computer (pocket PC or PPC), a tablet computer, a smart head unit, a smart television, a smart speaker, a desktop computer, a mobile computing apparatus, a notebook (for example, laptop) computer, a tablet computer, a set-top box, a telephone handset such as a so-called "smart" phone, a television, a camera, a display apparatus, a digital media player, a video game console, a vehicle-mounted computer, and a similar apparatus.

The link 30 may include one or more media or apparatuses that can transmit the encoded image from the source apparatus 10 to the destination apparatus 20. In a possible implementation, the link 30 may include one or more communication media that can enable the source apparatus 10 to directly send the encoded image to the destination apparatus 20 in real time. In this embodiment of this disclosure, the source apparatus 10 may modulate the encoded image according to a communication standard, where the communication standard may be a wireless communication protocol or the like; and may send a modulated image to the destination apparatus 20. The one or more communication media may include a wireless communication medium and/or a wired communication medium. For example, the one or more communication media may include a radio frequency (RF) spectrum or one or more physical transmission lines. The one or more communication media may be a part of a packet-based network. The packet-based network may be a local area network, a wide area network, a global network (for example, the Internet), or the like. The one or more communication media may include a router, a switch, a base station, another device that facilitates communication from the source apparatus 10 to the destination apparatus 20, or the like. This is not limited in embodiments of this disclosure.

In a possible implementation, the storage apparatus 40 may store the received encoded image sent by the source apparatus 10, and the destination apparatus 20 may directly obtain the encoded image from the storage apparatus 40. In this case, the storage apparatus 40 may include any one of a plurality of types of distributed or locally accessed data storage media. For example, the any one of the plurality of types of distributed or locally accessed data storage media may be a hard disk drive, a BLU-RAY disc, a digital versatile disc (DVD), a compact disc read-only memory (CD-ROM), a flash memory, a volatile or non-volatile memory, or any other appropriate digital storage medium for storing the encoded image.

In a possible implementation, the storage apparatus 40 may correspond to the file server or the other intermediate storage apparatus that can store the encoded image generated by the source apparatus 10, and the destination apparatus 20 may transmit, in the streaming manner, or download the image stored on the storage apparatus 40. The file server may be any type of server that can store the encoded image and send the encoded image to the destination apparatus 20. In a possible implementation, the file server may include a network server, a File Transfer Protocol (FTP) server, a network attached storage (NAS) apparatus, a local disk drive, or the like. The destination apparatus 20 may obtain the encoded image through any standard data connection (including an Internet connection). The any standard data connection may include a wireless channel (for example, a WI-FI connection), a wired connection (for example, a digital subscriber line (DSL) or a cable modem), or a combination of a wireless channel and a wired connection suitable for obtaining the encoded image stored on the file server. Transmission of the encoded image from the storage apparatus 40 may be streaming transmission, download transmission, or a combination thereof.

The implementation environment shown in FIG. 2 is merely a possible implementation. In addition, technologies in embodiments of this disclosure are not only applicable to the source apparatus 10 that can encode an image and the destination apparatus 20 that can decode the encoded image that are shown in FIG. 2, but also applicable to another apparatus that can encode an image and another apparatus that can decode the encoded image. This is not limited in embodiments of this disclosure.

In the implementation environment shown in FIG. 2, the source apparatus 10 includes a data source 120, an encoder 100, and an output interface 140. In some embodiments, the output interface 140 may include a modulator/demodulator (modem) and/or a transmitter. The transmitter may also be referred to as an emitter. The data source 120 may include an image capture apparatus (for example, a camera), an archive including a previously captured image, a feed-in interface for receiving an image from an image content provider, and/or a computer graphics system for generating an image, or a combination of these sources of images.

The data source 120 may send the image to the encoder 100, and the encoder 100 may encode the received image sent from the data source 120 to obtain the encoded image. The encoder may send the encoded image to the output interface. In some embodiments, the source apparatus 10 directly sends the encoded image to the destination apparatus 20 through the output interface 140. In another embodiment, the encoded image may alternatively be stored on the storage apparatus 40, so that the destination apparatus 20 subsequently obtains the encoded image for decoding and/or display.

In the implementation environment shown in FIG. 2, the destination apparatus 20 includes an input interface 240, a decoder 200, and a display apparatus 220. In some embodiments, the input interface 240 includes a receiver and/or a modem. The input interface 240 may receive the encoded image through the link 30 and/or from the storage apparatus 40, and then send the encoded image to the decoder 200. The decoder 200 may decode the received encoded image to obtain a decoded image. The decoder may send the decoded image to the display apparatus 220. The display apparatus 220 may be integrated with the destination apparatus 20 or disposed outside the destination apparatus 20. Generally, the display apparatus 220 displays the decoded image. The display apparatus 220 may be a display apparatus of any one of a plurality of types. For example, the display apparatus 220 may be a liquid-crystal display (LCD), a plasma display, an organic light-emitting diode (OLED) display, or another type of display apparatus.

Although not shown in FIG. 2, in some aspects, the encoder 100 and the decoder 200 may be integrated with an encoder and a decoder respectively, and may include an appropriate multiplexer-demultiplexer (MUX-DEMUX) unit or other hardware and software for encoding both audio and a video in a common data stream or a separate data stream. In some embodiments, if applicable, the MUX-DEMUX unit may comply with the International Telecommunication Union (ITU) H.223 multiplexer protocol or another protocol like the User Datagram Protocol (UDP).

Each of the encoder 100 and the decoder 200 may be any one of the following circuits: one or more microprocessors, a digital signal processor (DSP), an application-specific integrated circuit (ASIC), a field-programmable gate array (FPGA), discrete logic, hardware, or any combination thereof. If technologies in embodiments of this disclosure are partially implemented in software, an apparatus may store instructions for the software in an appropriate non-volatile computer-readable storage medium, and may execute the instructions in hardware through one or more processors, to implement the technologies in embodiments of this disclosure. Any one of the foregoing content (including hardware, software, a combination of hardware and software, and the like) may be considered as one or more processors. Each of the encoder 100 and the decoder 200 may be included in one or more encoders or decoders. Either the encoder or the decoder may be integrated as a part of a combined encoder/decoder (codec) in a corresponding apparatus.

In this embodiment of this disclosure, the encoder 100 may be generally referred to as "signaling" or "sending" some information to another apparatus, for example, the decoder 200. The term "signaling" or "sending" may generally refer to transmission of syntax elements and/or other data used to decode a compressed image. Such transmission may occur in real time or almost in real time. Alternatively, such communication may occur after a period of time, for example, may occur when a syntax element in an encoded bitstream is stored in a computer-readable storage medium during encoding. The decoding apparatus may then retrieve the syntax element at any time after the syntax element is stored in the medium.

Figure 3:
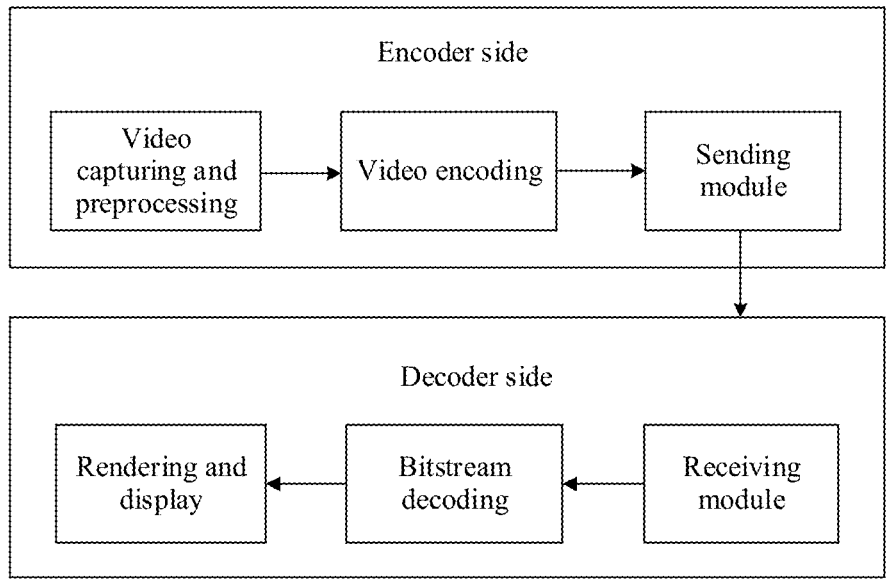
FIG. 3 is a diagram of still another implementation environment according to an embodiment of this disclosure.

FIG. 3 is a diagram of still another implementation environment according to an embodiment of this disclosure. In the implementation environment, the encoding and decoding method provided in embodiments of this disclosure is applied to a virtual reality streaming scenario. Refer to FIG. 3. The implementation environment includes an encoder side and a decoder side. The encoder side includes a video collection and preprocessing module (also referred to as a preprocessing module), a video encoding module, and a sending module. The decoder side includes a receiving module, a bitstream decoding module, and a rendering and display module.

A collection module of the encoder side collects a video, where the video includes a plurality of frames of images to be encoded. Then, a preprocessing module preprocesses each frame of image. Then, the video encoding module encodes each frame of preprocessed image according to the encoding method provided in embodiments of this disclosure, to obtain a bitstream. The sending module sends the bitstream to the decoder side via a transport network. The receiving module of the decoder side first receives the bitstream. Then, the decoding module decodes the bitstream according to the decoding method provided in embodiments of this disclosure to obtain image information. Then, the rendering and display module renders and displays the image information. In addition, after obtaining the bitstream, the encoder side may alternatively store the bitstream.

It should be noted that the encoding and decoding method provided in embodiments of this disclosure may be applied to a plurality of scenarios, and images coded in various scenarios may all be images included in an image file, or may all be images included in a video file. The coded image may be an image in a format, for example, red, green, blue (RGB), YUV444, or YUV420. It should be noted that, based on the implementation environments shown in FIG. 1, FIG. 2, and FIG. 3, any one of the following encoding methods may be performed by an encoder side, and any one of the following decoding methods may be performed by a decoder side.

The following describes the encoding methods provided in embodiments of this disclosure.

Figure 4:
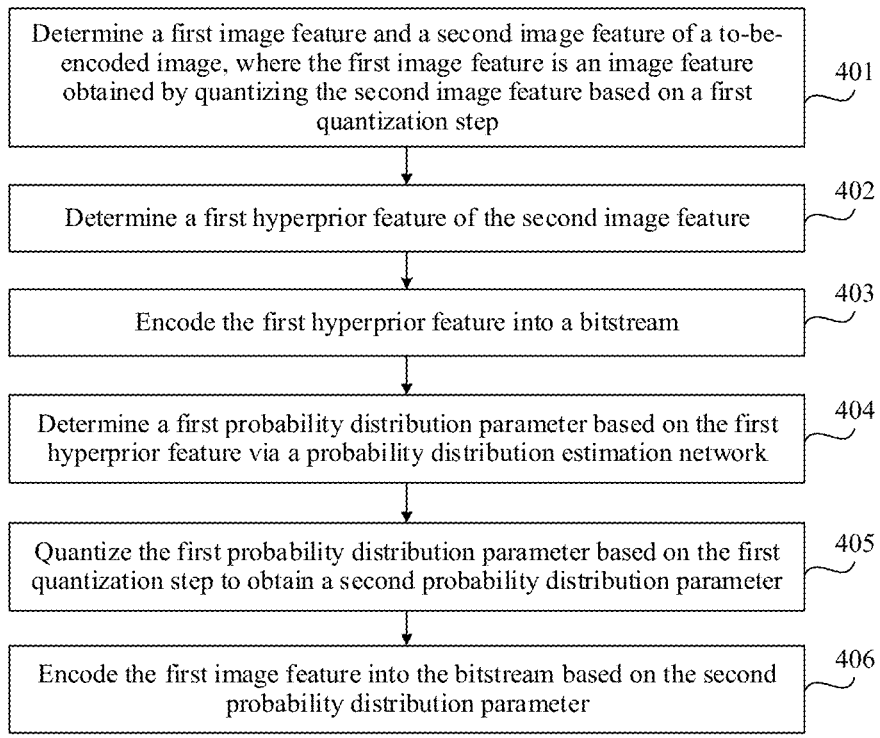
FIG. 4 is a flowchart of an encoding method according to an embodiment of this disclosure.

FIG. 4 is a flowchart of an encoding method according to an embodiment of this disclosure. The method is applied to an encoder side. As shown in FIG. 4, the method includes the following steps.

Step 401: Determine a first image feature and a second image feature of a to-be-encoded image, where the first image feature is an image feature obtained by quantizing the second image feature based on a first quantization step.

In this embodiment of this disclosure, the encoder side inputs the to-be-encoded image into an image feature extraction network to obtain the second image feature of the image, where the second image feature is an unquantized image feature. The encoder side quantizes the second image feature based on the first quantization step to obtain the first image feature, where the first image feature is a quantized image feature.

It should be noted that each of the first image feature and the second image feature includes image features of a plurality of feature points, an image feature of each feature point in the first image feature may be referred to as a first feature value of the corresponding feature point, and an image feature of each feature point in the second image feature may be referred to as a second feature value of the corresponding feature point.

Optionally, the image feature extraction network is a CNN, the first image feature is represented by a first feature map, the second image feature is represented by a second feature map, and each of the first feature map and the second feature map has a plurality of feature points. It should be noted that the image feature extraction network in this embodiment of this disclosure is obtained through pre-training, and a network structure, a training manner, and the like of the image feature extraction network are not limited in embodiments of this disclosure. For example, the image feature extraction network may be a fully connected network or the foregoing CNN, and a convolution in the CNN may be a 2D convolution or a 3D convolution. In addition, a quantity of network layers included in the image feature extraction network and a quantity of nodes at each layer are not limited in embodiments of this disclosure.

Figure 5:
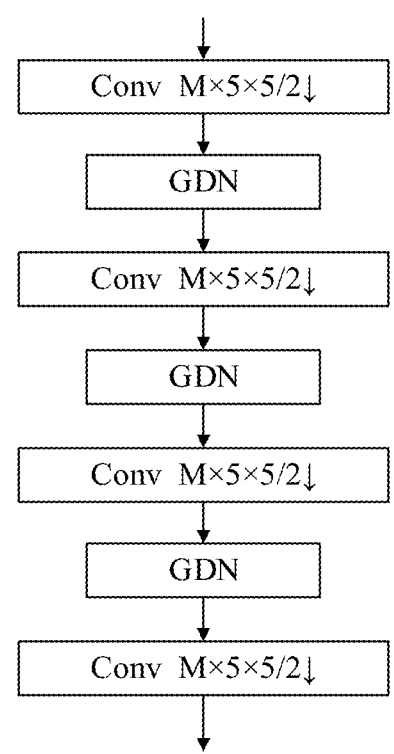
FIG. 5 is a diagram of a structure of an image feature extraction network according to an embodiment of this disclosure.

FIG. 5 is a diagram of a structure of an image feature extraction network according to an embodiment of this disclosure. Refer to FIG. 5. The image feature extraction network is a CNN, and the CNN includes four convolution (Conv) layers and three interleaved and cascaded grasp detection network (GDN) layers. A size of a convolution kernel at each convolutional layer is 5×5, a quantity of channels of an output feature map is M, and 2-fold downsampling is performed on a width and a height at each convolutional layer. For example, for an input 16W×16H×3 image, a size of a feature map output by the CNN is W×H×M. It should be noted that the structure of the CNN shown in FIG. 5 is not intended to limit embodiments of this disclosure. For example, a size of a convolution kernel, a quantity of channels of a feature map, a downsampling multiple, a quantity of downsampling times, a quantity of convolution layers, and the like may all be adjusted.

Optionally, in this embodiment of this disclosure, the first quantization step is obtained based on a bit rate of the image via a gain network, and the gain network is used to determine quantization steps separately corresponding to a plurality of types of bit rates. For example, the encoder side determines a first quality factor based on the bit rate of the image, and inputs the first quality factor into the gain network to obtain the first quantization step. It should be noted that different bit rates correspond to different quality factors, and different quantization steps may be obtained via the gain network. Alternatively, a mapping relationship between the bit rate and a quantization step is stored in advance, and the corresponding quantization step is obtained from the mapping relationship based on the bit rate of the image as the first quantization step. Optionally, in some other embodiments, the first quantization step is a first quantization step corresponding to the first quality factor obtained from a mapping relationship between the quality factor and the quantization step after the first quality factor is determined based on the bit rate of the to-be-encoded image.

The quality factor may also be replaced with a quantization parameter. There may be a plurality of quantization processing manners in the foregoing implementation process, for example, uniform quantization or scalar quantization. The scalar quantization may further have an offset, to be specific, after bias processing is performed on to-be-quantized data (for example, the second image feature) based on the offset, scalar quantization is performed based on a quantization step. Optionally, in this embodiment of this disclosure, quantization processing performed on the image feature includes quantization and rounding. For example, it is assumed that the second image feature is represented by a feature map y, a numerical range of the second image feature falls within an interval [0, 100], the first quantization step is represented by q1, q1 is 0.5, and the first image feature is represented by a feature map $y_s$. In this case, the encoder side quantizes a feature value of each feature point in the feature map y to obtain a feature map $y_s$, and rounds a feature value of each feature point in the feature map $y_s$ to obtain a feature map ys', that is, obtains the first image feature. A numerical range of the first image feature falls within an interval [0, 50]. The uniform quantization is used as an example. A feature value obtained by quantizing any feature value A based on a quantization step q is x'=x*q.

Optionally, first quantization steps for quantizing image features of feature points may be the same or different. For example, feature points in a same channel use a same first quantization step, or feature values of different channels in a same spatial location use a same first quantization step. It is assumed that a size of the to-be-quantized second image feature is W×H×M. Under any quality factor i, a first quantization step of a feature point whose coordinates are (k, j, l) in the second image feature is $q_i(k, j, l)$, where $q_i(k, j, l)$ may be obtained through learning by the gain network or may be obtained based on a stored mapping relationship. k∈[1, W], j∈[1, H], and l∈[1, M]. It should be understood that different quantization parameters QP correspond to different quantization steps q, and the quantization parameters QP and the quantization steps q are in a one-to-one correspondence. For example, in some standard solutions, a mapping relationship between a quantization parameter and a quantization step may be represented as $$q = (2^{1/6})^{QP-4}.$$

Certainly, another function may alternatively be designed to represent the mapping relationship between QP and q.

It should be noted that a quantization processing manner below is similar to that herein. For the quantization processing manner below, refer to the manner herein. Details are not described below again in embodiments of this disclosure.

Step 402: Determine a first hyperprior feature of the second image feature.

In this embodiment of this disclosure, to subsequently obtain a probability distribution parameter (that is, a first probability distribution parameter) of an unquantized image feature in step 404, the encoder side determines a first hyperprior feature (for example, the first hyperprior feature of the second image feature) of the unquantized image feature before step 404. There is a plurality of implementations in which the encoder side determines the first hyperprior feature of the second image feature. The following describes two of the plurality of implementations.

A first implementation in which the encoder side determines the first hyperprior feature of the second image feature is: inputting the second image feature into a hyper encoder network to obtain the first hyperprior feature. In other words, the encoder side inputs the unquantized image feature into the hyper encoder network to obtain the first hyperprior feature of the unquantized image feature. A second implementation in which the encoder side determines the first hyperprior feature of the second image feature is: inversely quantizing the first image feature based on the first quantization step to obtain a third image feature of the image; and inputting the third image feature into a hyper encoder network to obtain the first hyperprior feature. The first hyperprior feature may also be considered as a first hyperprior feature of the third image feature, or may be considered as the first hyperprior feature of the second image feature. The second image feature is an image feature obtained before quantization, and the third image feature is an image feature obtained through inverse quantization. Therefore, although the first image feature and the third image feature are numerically different, image information represented by the first image feature and the third image feature is basically equivalent.

Optionally, the hyper encoder network outputs the first hyperprior feature. Alternatively, the hyper encoder network outputs a second hyperprior feature. The encoder side quantizes the second hyperprior feature based on a third quantization step to obtain the first hyperprior feature, where the first hyperprior feature is a quantized hyperprior feature. The third quantization step is the same as or different from the first quantization step. That is, a quantization operation may also be performed on a hyperprior feature to compress the hyperprior feature. Optionally, the hyperprior feature may also be referred to as side information, and the side information may be understood as further extracting a feature from an image feature.

It should be noted that each of the first hyperprior feature and the second hyperprior feature includes hyperprior features of a plurality of feature points. For example, in step 404, the image feature of each feature point in the first image feature is input into the hyper encoder network to obtain a hyperprior feature of the feature point in the first hyperprior feature. In addition, the hyper encoder network in this embodiment of this disclosure is obtained through pre-training. A network structure, a training manner, and the like of the hyper encoder network are not limited in embodiments of this disclosure. For example, the hyper encoder network may be a CNN or a fully connected network. Optionally, the hyper encoder network in this specification may also be referred to as a hyperprior network.

Step 403: Encode the first hyperprior feature into a bitstream.

In this embodiment of this disclosure, the encoder side encodes the first hyperprior feature into the bitstream, so that a decoder side subsequently performs decoding based on the first hyperprior feature.

Optionally, the encoder side encodes the first hyperprior feature into the bitstream through entropy encoding. For example, the encoder side encodes, based on a specified probability distribution parameter, the first hyperprior feature into the bitstream through entropy encoding. The specified probability distribution parameter is a probability distribution parameter determined in advance via a probability distribution estimation network. A network structure, a training method, and the like of the probability distribution estimation network are not limited in embodiments of this disclosure.

Step 404: Determine a first probability distribution parameter based on the first hyperprior feature via a probability distribution estimation network.

In this embodiment of this disclosure, the probability distribution estimation network is used to determine the probability distribution parameter of the unquantized image feature. Based on this, the encoder side determines the first probability distribution parameter based on the first hyperprior feature via the probability distribution estimation network, where the first probability distribution parameter represents probability distribution of the unquantized image feature (for example, the second image feature or the third image feature). It should be noted that the probability distribution parameter in this specification may be any parameter for representing probability distribution of an image feature, for example, a mean value and a variance (or a standard deviation) of Gaussian distribution, a location parameter and a scale parameter of Laplace distribution, or a mean value and a scale parameter of logistic distribution; and for another example, another model parameter.

Optionally, to be consistent with a decoding process of the decoder side, the encoder side parses the bitstream to obtain the first hyperprior feature, and determines, based on the first hyperprior feature obtained through parsing, the first probability distribution parameter via the probability distribution estimation network.

It can be learned from the foregoing descriptions that the first hyperprior feature is a quantized hyperprior feature, or may be an unquantized hyperprior feature. Based on this, in an implementation in which the first hyperprior feature is a quantized hyperprior feature, the encoder side inversely quantizes the first hyperprior feature based on the third quantization step to obtain the second hyperprior feature, and inputs the second hyperprior feature into the probability distribution estimation network to obtain the first probability distribution parameter. In an implementation in which the first hyperprior feature is an unquantized hyperprior feature, the encoder side inputs the first hyperprior feature into the probability distribution estimation network to obtain the first probability distribution parameter. The probability distribution estimation network may also be considered as a hyper decoder network, and the hyper decoder network is used to determine a probability distribution parameter based on a hyperprior feature.

In addition to the foregoing implementation of determining the first probability distribution parameter, the encoder side may alternatively determine the first probability distribution parameter based on a context feature, to improve accuracy of the first probability distribution parameter. This is described below.

Optionally, in an implementation, the encoder side inputs the third image feature of the image into a context network to obtain a context feature of the third image feature. The third image feature is an image feature obtained by inversely quantizing the first image feature based on the first quantization step. The encoder side determines a first prior feature based on the first hyperprior feature, and inputs the first prior feature and the context feature into the probability distribution estimation network to obtain the first probability distribution parameter. That is, the encoder side extracts a context feature from an inversely quantized image feature to determine a first probability distribution parameter based on the context feature and a first prior feature.

In an implementation in which the first hyperprior feature is a quantized hyperprior feature, the encoder side parses the bitstream to obtain the first hyperprior feature, inversely quantizes, based on the third quantization step, the first hyperprior feature obtained through parsing to obtain the second hyperprior feature, and inputs the second hyperprior feature into the hyper decoder network to obtain the first prior feature. In an implementation in which the first hyperprior feature is a quantized hyperprior feature, the encoder side parses the bitstream to obtain the first hyperprior feature, and inputs the first hyperprior feature obtained through parsing into the hyper decoder network to obtain the first prior feature.

Optionally, based on the foregoing descriptions, because image information represented by the second image feature and the third image feature is basically equivalent, the encoder side may also input the second image feature into the context network to obtain a context feature of the second image feature, where the context feature of the second image feature is the context feature of the third image feature.

It should be noted that the context feature of the third image feature includes a context feature of each feature point in a plurality of feature points, and the first probability distribution parameter includes probability distribution parameters of the plurality of feature points. That is, the encoder side may determine the context feature of each feature point in the plurality of feature points and a probability distribution parameter of each feature point in parallel.

In another implementation, the encoder side inputs the first image feature into a context network to obtain a context feature of the first image feature, determines a first prior feature based on the first hyperprior feature, quantizes the first prior feature based on a second quantization step to obtain a second prior feature, and inputs the second prior feature and the context feature into the probability distribution estimation network to obtain the first probability distribution parameter. That is, the encoder side may alternatively extract a context feature from an inversely quantized image feature, and then obtain a second prior feature by adding a quantization operation on a first prior feature, to determine a first probability distribution parameter based on the second prior feature and the context feature. The second quantization step is the same as or different from the first quantization step.

It should be noted that, in this implementation, an implementation in which the encoder side determines the first prior feature is consistent with a related process in the foregoing implementation, and details are not described herein again. In addition, in an implementation of determining probability distribution based on the context feature, the hyper decoder network is used to determine a prior feature based on a hyperprior feature, and the probability distribution estimation network is used to determine a probability distribution parameter based on the prior feature and a context feature. Both the hyper decoder network and the probability distribution estimation network in this embodiment of this disclosure are obtained through pre-training. Network structures, training manners, and the like of the hyper decoder network and the probability distribution estimation network are not limited in embodiments of this disclosure. For example, each of the hyper decoder network and the probability distribution estimation network may be a CNN, a recurrent neural network, a fully connected network, or the like.

Optionally, the probability distribution estimation network in this embodiment of this disclosure is modeled by using a Gaussian model (for example, a Gaussian single model (GSM) or a Gaussian mixture model (GMM)). To be specific, it is assumed that a feature value of each feature point in the unquantized image feature (for example, the second image feature or the third image feature) conforms to the GSM or the GMM, the first probability distribution parameter obtained by the probability distribution estimation network includes a mean value $\mu$ and a standard deviation $\sigma$. Optionally, the probability distribution estimation network may alternatively use a Laplace distribution model. Correspondingly, the first probability distribution parameter includes a location parameter $\lambda$ and a scale parameter b. The probability distribution estimation network may alternatively use a logistic distribution model. Correspondingly, the first probability distribution parameter includes a mean value $\mu$ and a scale parameter S. The Gaussian model is used as an example. A probability distribution function corresponding to probability distribution of any feature point in the first probability distribution parameter is shown in the following formula (1), where X is a second feature value of the feature point:

$$f(x; \mu, \sigma) = \frac{1}{\sigma\sqrt{2\pi}} \exp\left(-\frac{(x-\mu)^2}{2\sigma^2}\right) \tag{1}$$

Step 405: Quantize the first probability distribution parameter based on the first quantization step to obtain a second probability distribution parameter.

After obtaining the first probability distribution parameter of the unquantized image feature, the encoder side quantizes the first probability distribution parameter based on the first quantization step to obtain a second probability distribution parameter, where the second probability distribution parameter represents probability distribution of the quantized image feature (that is, the first image feature). A probability distribution parameter of each feature point in the first probability distribution parameter is quantized based on the first quantization step to obtain a probability distribution parameter of a corresponding feature point in the second probability distribution parameter.

The Gaussian model is used as an example. A first quantization step of a feature point whose coordinates are (k, j, l) is $q_i(k, j, l)$, and a probability distribution parameter of the feature point in the first probability distribution parameter is $\mu(k, j, l)$ and $\sigma(k, j, l)$. $\mu(k, j, l)$ and $\sigma(k, j, l)$ are quantized based on the quantization step $q_i(k, j, l)$ to obtain probability distribution parameters $\mu_s(k, j, l)$ and $\sigma_s(k, j, l)$ of the feature point in the second probability distribution parameter. If uniform quantization is performed, $\mu_s=\mu/q$ and $\sigma_s=\sigma/q$. A probability distribution function corresponding to a probability distribution parameter of any feature point in the second probability distribution parameter is shown in the following formula (2), where A is a first feature value of the feature point:

$$f(x; \mu_s, \sigma_s) = \frac{1}{\sigma/q\sqrt{2\pi}} \exp\left(-\frac{(x-\mu/q)^2}{2(\sigma/q)^2}\right) \tag{2}$$

A principle of step 405 is explained herein. It is assumed that a quantization operation is uniform quantization. The Gaussian model is used as an example. It is assumed that a probability distribution function of the variable A is shown in the foregoing formula (1). In this case, a probability $P_1$ of the variable A in an interval $[a_2*q, a_1*q]$ is shown in the following formula (3), where q is a quantization step:

$$P_1 = \int_{a_2*q}^{a_1*q} f(x; \mu, \sigma)d(x) = \int_{a_2}^{a_1} \frac{1}{\sigma\sqrt{2\pi}} \exp\left(-\frac{(x*q-\mu)^2}{2\sigma^2}\right) d(qx) = \tag{3}$$

$$\int_{a_2}^{a_1} \frac{1}{\sigma/q\sqrt{2\pi}} \exp\left(-\frac{(x-\mu/q)^2}{2(\sigma/q)^2}\right) d(x)$$

The variable A is quantized based on the quantization step q to obtain a quantized variable x'=x/q. In this case, the probability $P_1$ of the variable A in the interval $[a_2*q, a_1*q]$ is equal to a probability $P_2$ of the variable x' in an interval $[a_2, a_1]$. Based on this, it is assumed that a probability distribution function of the variable x' is g(x). In this case, $P_1=\int_{a_2}^{a_1} g(x)d(x)$.

$$g(x) = \frac{1}{\sigma/q\sqrt{2\pi}} \exp\left(-\frac{(x-\mu/q)^2}{2(\sigma/q)^2}\right)$$

is obtained by comparing the foregoing formula (3), and g(x) is the same as the foregoing formula (2). It can be learned that when a probability distribution parameter of an image feature obtained before quantization is known, a probability distribution parameter of a quantized image feature may be obtained by quantizing the probability distribution parameter based on the first quantization step.

Similar to the Laplace distribution model and the logistic distribution model, the second probability distribution parameter may be obtained from the first probability distribution parameter by scaling (that is, quantizing) a parameter of a corresponding model.

Step 406: Encode the first image feature into the bitstream based on the second probability distribution parameter.

In this embodiment of this disclosure, after obtaining the second probability distribution parameter, the encoder side encodes the first image feature into the bitstream based on the second probability distribution parameter. The encoder side encodes the image feature of each feature point in the first image feature into the bitstream based on a probability distribution parameter of each feature point in the second probability distribution parameter. For example, the encoder side encodes the first image feature into the bitstream through entropy encoding.

The foregoing describes the encoding method provided in embodiments of this disclosure. The following describes the foregoing content again with reference to FIG. 6 to FIG. 10.

Figure 6:
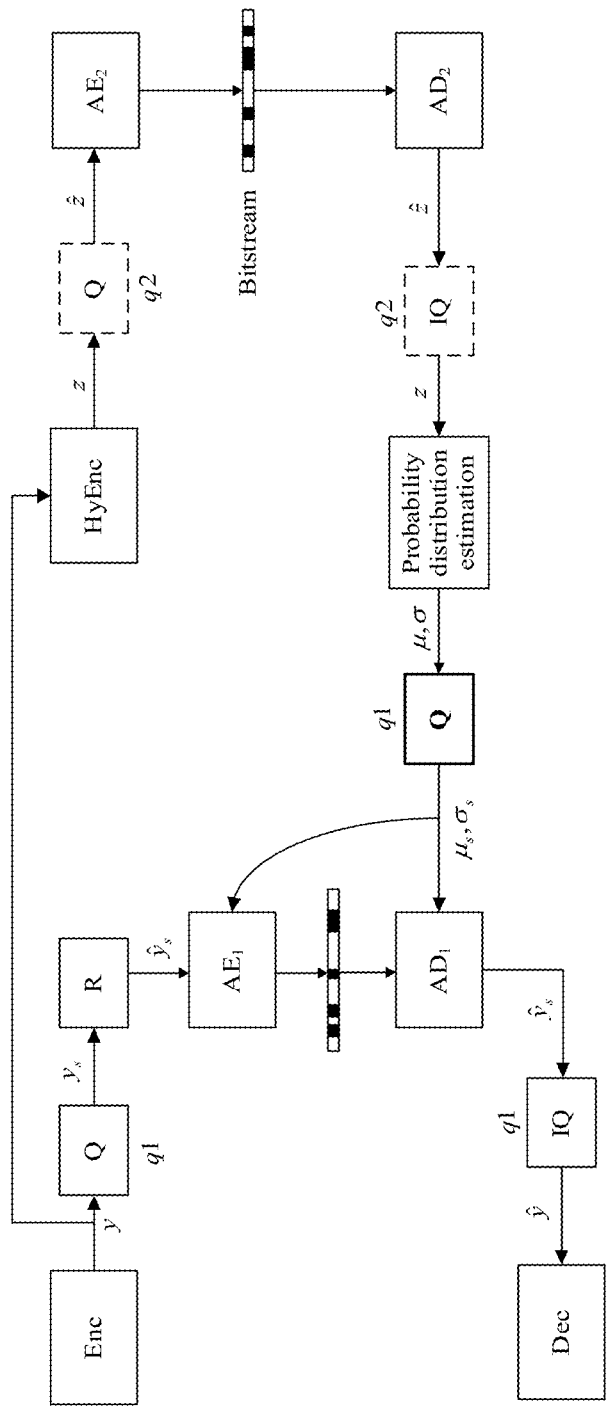
FIG. 6 is a flowchart of an encoding and decoding method according to an embodiment of this disclosure.

FIG. 6 is a flowchart of an encoding and decoding method according to an embodiment of this disclosure. Refer to FIG. 6. In an encoding process, a to-be-encoded image is input into an encoder (Enc) network to obtain a to-be-quantized feature map y (that is, a second image feature). The encoder network is an image feature extraction network. Quantization (Q) is performed on each feature element in the feature map y based on a quantization step q1 (that is, a first quantization step) to obtain a feature map $y_s$. Rounding (R) is performed on each feature element in the feature map $y_s$ to obtain a feature map $\hat{y}_s$ (that is, a first image feature). In addition, the feature map y is input into a hyper encoder (HyEnc) network to obtain a hyperprior feature z. Optionally, the hyperprior feature z is quantized based on a quantization step q2 to obtain a hyperprior feature $\hat{z}$ (that is, a first hyperprior feature). The quantization step q2 may be the same as or different from the quantization step q1. The hyperprior feature $\hat{z}$ is encoded into a bitstream through entropy encoding (AE$_2$). Then, the hyperprior feature $\hat{z}$ is obtained by parsing the bitstream through entropy decoding (AD$_2$). Optionally, inverse quantization (IQ) is performed on the hyperprior feature $\hat{z}$ based on the quantization step q2 to obtain the hyperprior feature z. The hyperprior feature z is input into a probability distribution estimation network to obtain probability distribution parameters μ and σ (that is, first probability distribution parameters) of each feature element in the feature map y. The probability distribution parameters μ and σ are quantized based on the quantization step q1 to obtain probability distribution parameters $\mu_s$ and $\sigma_s$ (that is, second probability distribution parameters) of each feature element in the feature map $\hat{y}_s$. Based on the probability distribution parameters $\mu_s$ and $\sigma_s$ of each feature element in the feature map $\hat{y}_s$, the feature map $\hat{y}_s$ is encoded into the bitstream through entropy encoding (AE$_1$).

Figure 7:
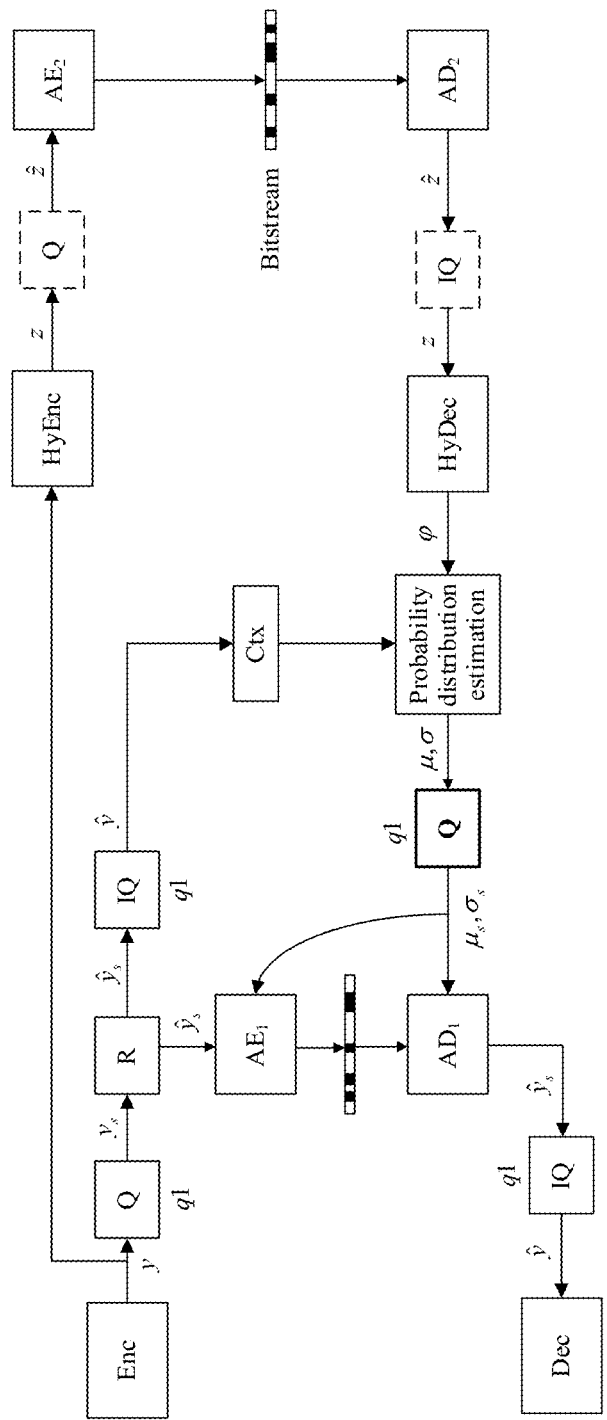
FIG. 7 is a flowchart of another encoding and decoding method according to an embodiment of this disclosure.

FIG. 7 is a flowchart of another encoding and decoding method according to an embodiment of this disclosure. Refer to FIG. 7. In an encoding process, a to-be-encoded image is input into an Enc network to obtain a to-be-quantized feature map y. The encoder network is an image feature extraction network. Quantization (Q) is performed on each feature element in the feature map y based on a quantization step q1 to obtain a feature map $y_s$. Rounding (R) is performed on each feature element in the feature map $y_s$ to obtain a feature map $\hat{y}_s$. In addition, the feature map y is input into a HyEnc network to obtain a hyperprior feature z. Optionally, the hyperprior feature z is quantized based on a quantization step q2 to obtain a hyperprior feature $\hat{z}$ (that is, a first hyperprior feature). The hyperprior feature $\hat{z}$ is encoded into a bitstream through entropy encoding (AE$_2$). Then, the hyperprior feature $\hat{z}$ is obtained by parsing the bitstream through entropy decoding (AD$_2$). Optionally, inverse quantization (IQ) is performed on the hyperprior feature $\hat{z}$ based on the quantization step q2 to obtain the hyperprior feature z. The hyperprior feature z is input into a hyper decoder (HyDec) network (that is, a probability distribution estimation network) to obtain a prior feature φ (that is, a first prior feature). In addition, the feature map $\hat{y}_s$ is inversely quantized based on the first quantization step q1 to obtain a feature map $\hat{y}$ (that is, a third image feature). The feature map $\hat{y}$ is input into a context (Ctx) network to obtain a context feature of each feature point in the feature map $\hat{y}$. The context feature of each feature point and the prior feature φ are input into the probability distribution estimation network to obtain probability distribution parameters μ and σ (that is, first probability distribution parameters) of each feature element in the feature map y. The probability distribution parameters μ and σ are quantized based on the quantization step q1 to obtain probability distribution parameters $\mu_s$ and $\sigma_s$ (that is, second probability distribution parameters) of each feature element in the feature map $\hat{y}_s$. Based on the probability distribution parameters $\mu_s$ and $\sigma_s$ of each feature element in the feature map $\hat{y}_s$, the feature map $\hat{y}_s$ is encoded into the bitstream through entropy encoding (AE$_1$).

Figure 8:
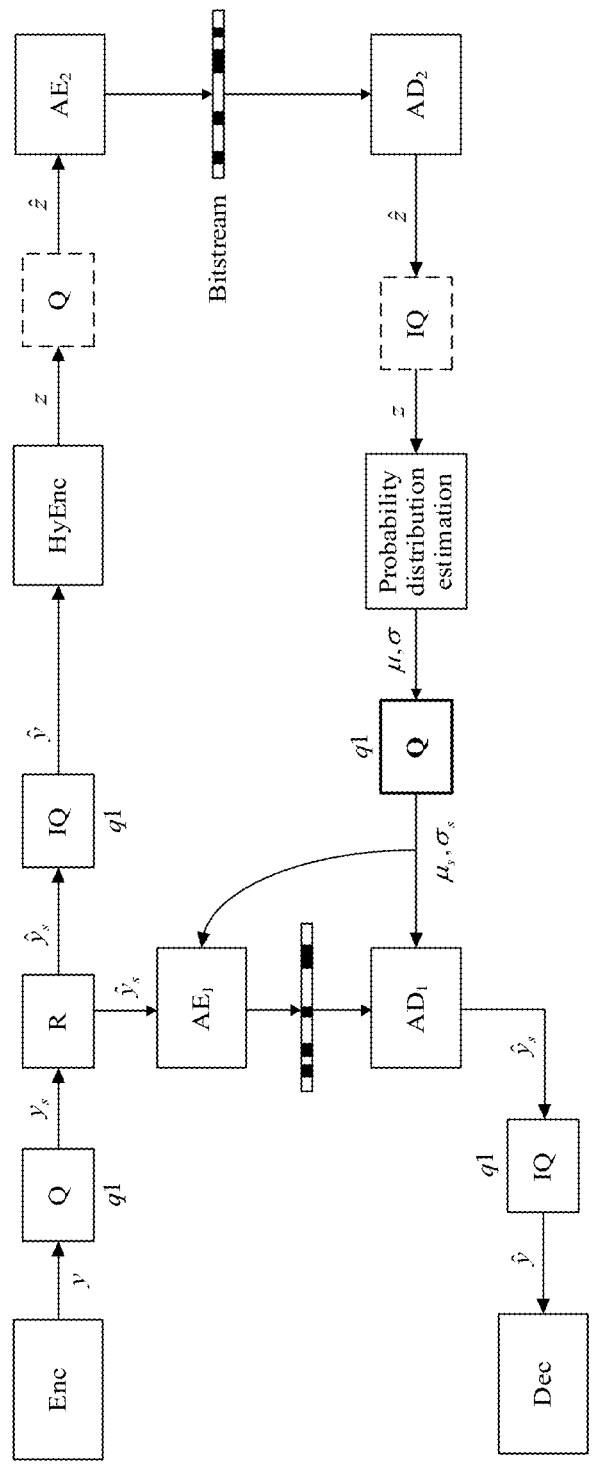
FIG. 8 is a flowchart of still another encoding and decoding method according to an embodiment of this disclosure.

FIG. 8 is a flowchart of still another encoding and decoding method according to an embodiment of this disclosure. A difference between FIG. 8 and FIG. 6 lies in that, in an encoding process, a feature map $\hat{y}_s$ is inversely quantized based on a quantization step q1 to obtain a feature map $\hat{y}$. The feature map $\hat{y}$ is input into a hyper encoder network to obtain a hyperprior feature z.

Figure 9:
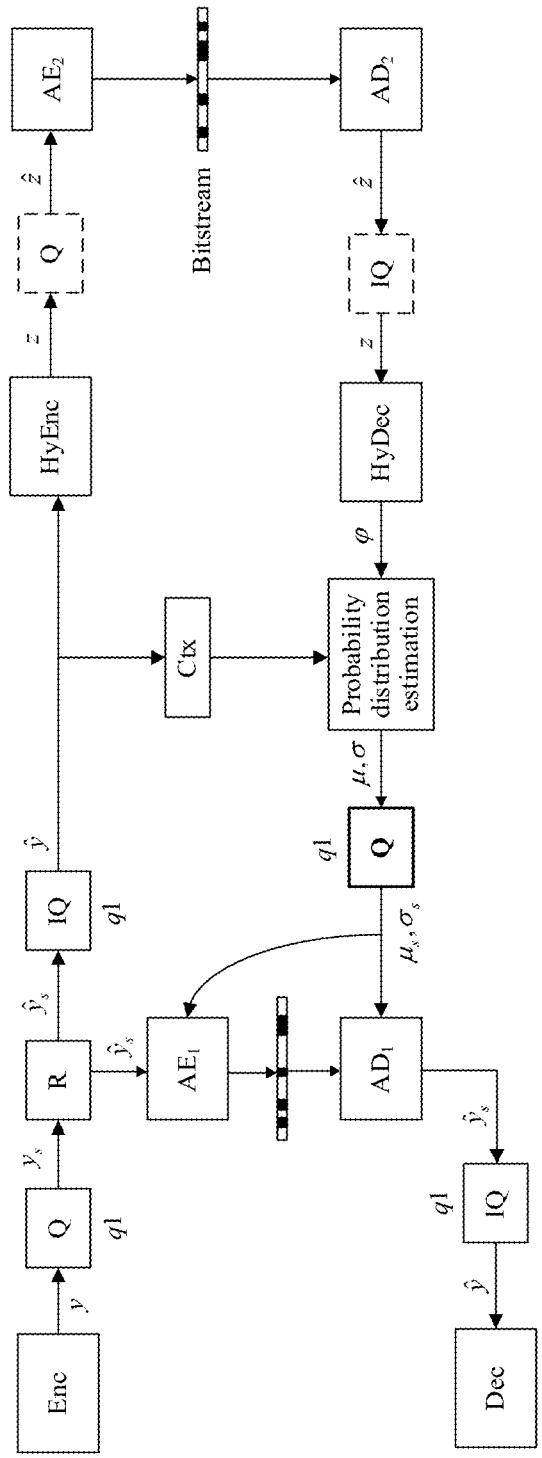
FIG. 9 is a flowchart of still another encoding and decoding method according to an embodiment of this disclosure.

FIG. 9 is a flowchart of still another encoding and decoding method according to an embodiment of this disclosure. A difference between FIG. 9 and FIG. 7 lies in that, in an encoding process, a feature map $\hat{y}_s$ is inversely quantized based on a quantization step q1 to obtain a feature map $\hat{y}$. The feature map $\hat{y}$ is input into a hyper encoder network to obtain a hyperprior feature z.

Figure 10:
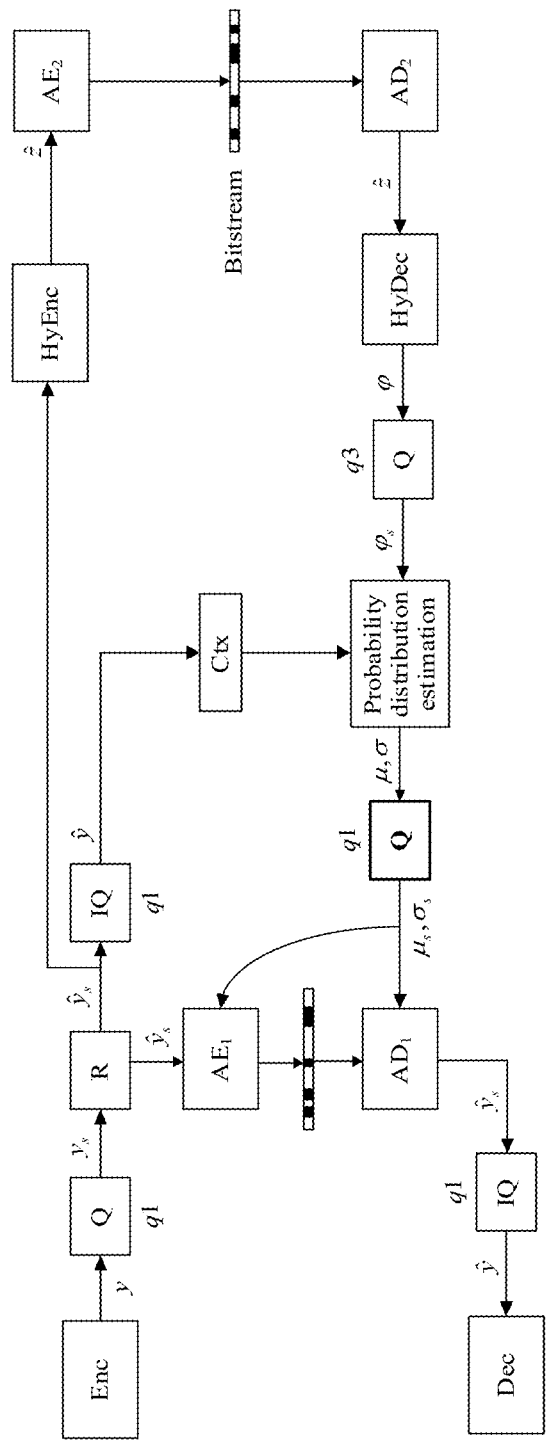
FIG. 10 is a flowchart of still another encoding and decoding method according to an embodiment of this disclosure.

FIG. 10 is a flowchart of still another encoding and decoding method according to an embodiment of this disclosure. A difference between FIG. 10 and FIG. 7 and FIG. 9 lies in that, in an encoding process, a feature map $\hat{y}_s$ is input into a hyper encoder network to obtain a hyperprior feature $\hat{z}$. In addition, after a prior feature φ is obtained via a hyper decoder network, a quantization operation is added, to be specific, the prior feature φ is quantized based on a quantization step q3 (that is, a second quantization step) to obtain a prior feature $\varphi_s$. The quantization step q3 is the same as or different from a quantization step q1. A context feature of each feature point and the prior feature $\varphi_s$ are input into a probability distribution estimation network to obtain first probability distribution parameters μ and σ.

In conclusion, in embodiments of this disclosure, to obtain the probability distribution parameter of the quantized image feature, in an encoding process, the first probability distribution parameter is determined based on a hyperprior feature of the unquantized image feature via the probability distribution estimation network, where the first probability distribution parameter represents probability distribution of the unquantized image feature. Then, the first probability distribution parameter is quantized based on the first quantization step (that is, a quantization step for quantizing an image feature), to obtain the second probability distribution parameter for representing probability distribution of the quantized image feature. It can be learned that only the probability distribution estimation network for determining the probability distribution parameter of the unquantized image feature needs to be obtained through training in this solution. Even in a multi-bit-rate scenario, a numerical range of the unquantized image feature is stable and is not affected by a quantization step, in other words, an input numerical range of the probability distribution estimation network does not change with a bit rate. Therefore, training on the probability distribution estimation network is less difficult and stable, and the probability distribution estimation network with good performance can be obtained through training. This helps improve encoding and decoding performance.

Figure 11:
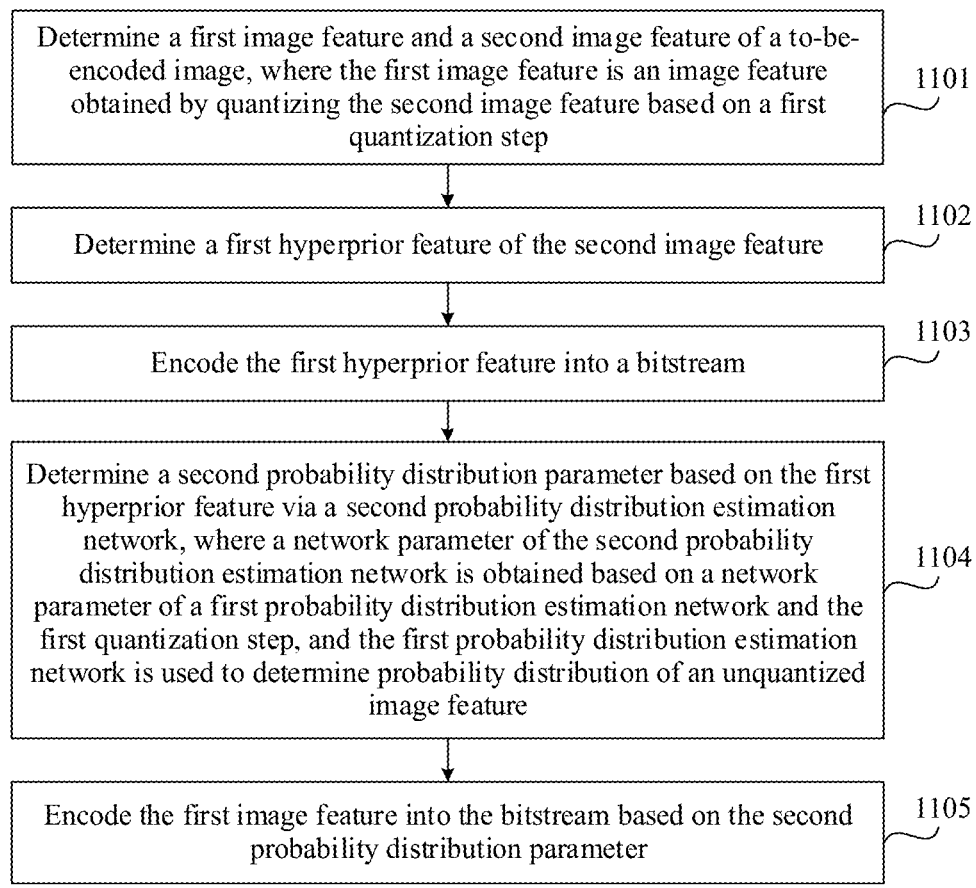
FIG. 11 is a flowchart of another encoding method according to an embodiment of this disclosure.

FIG. 11 is a flowchart of another encoding method according to an embodiment of this disclosure. The method is applied to an encoder side. It should be noted that, it is assumed that the probability distribution estimation network in the embodiment in FIG. 4 is referred to as a first probability distribution estimation network. In this case, a difference between the embodiment in FIG. 11 and the embodiment in FIG. 4 lies in that, in the encoding method shown in FIG. 11, a second probability distribution parameter is directly obtained via a second probability distribution estimation network, to be specific, the second probability distribution estimation network directly outputs a probability distribution parameter of a quantized image feature. A network parameter of the second probability distribution estimation network is obtained based on a network parameter of the first probability distribution estimation network and a first quantization step. In this way, only the first probability distribution estimation network only needs to be obtained through training. Refer to FIG. 11. The method includes the following steps.

Step 1101: Determine a first image feature and a second image feature of a to-be-encoded image, where the first image feature is an image feature obtained by quantizing the second image feature based on the first quantization step.

In this embodiment of this disclosure, the encoder side inputs the to-be-encoded image into an image feature extraction network to obtain the second image feature of the image. The encoder side quantizes the second image feature based on the first quantization step to obtain the first image feature. A specific implementation process is the same as the specific implementation process of step 401 in the embodiment in FIG. 4. For details, refer to the related descriptions in step 401. Details are not described herein again.

Step 1102: Determine a first hyperprior feature of the second image feature.

Optionally, in an implementation, the encoder side inputs the second image feature into a hyper encoder network to obtain the first hyperprior feature. In another implementation, the encoder side inversely quantizes the first image feature based on the first quantization step to obtain a third image feature of the image, and inputs the third image feature into a hyper encoder network to obtain the first hyperprior feature. A specific implementation process is the same as the specific implementation process of step 402 in the embodiment in FIG. 4. For details, refer to the related descriptions in step 402. Details are not described herein again.

Step 1103: Encode the first hyperprior feature into a bitstream.

In this embodiment of this disclosure, the encoder side encodes the first hyperprior feature into the bitstream, so that a decoder side subsequently performs decoding based on the first hyperprior feature. Optionally, the encoder side encodes the first hyperprior feature into the bitstream through entropy encoding. A specific implementation process is the same as the specific implementation process of step 403 in the embodiment in FIG. 4. For details, refer to the related descriptions in step 403. Details are not described herein again.

Step 1104: Determine the second probability distribution parameter based on the first hyperprior feature via the second probability distribution estimation network, where the network parameter of the second probability distribution estimation network is obtained based on the network parameter of the first probability distribution estimation network and the first quantization step, and the first probability distribution estimation network is used to determine probability distribution of an unquantized image feature.

Optionally, to be consistent with a decoding process of the decoder side, the encoder side parses the bitstream to obtain the first hyperprior feature, and determines, based on the first hyperprior feature obtained through parsing, the second probability distribution parameter via the second probability distribution estimation network.

Optionally, a last layer in the first probability distribution estimation network is a convolutional layer, and network parameters of the convolutional layer include a weight and an offset. Based on this, a weight and an offset of a last layer (convolutional layer) in the second probability distribution estimation network are obtained based on the weight and the offset of the last layer (convolutional layer) in the first probability distribution estimation network and the first quantization step. Optionally, the second probability distribution estimation network is obtained by multiplying a network parameter of the last layer in the first probability distribution estimation network by the first quantization step. Alternatively, in some embodiments, the second probability distribution estimation network is obtained by adjusting the network parameter of the last layer in the first probability distribution estimation network in a manner of binary leftward displacement or rightward displacement, so that an adjusted network parameter is equal to the network parameter obtained before adjustment multiplied by the first quantization step.

For example, the last layer in the first probability distribution estimation network is the convolutional layer, and both the weight w and the offset b of the convolutional layer are multiplied by the first quantization step q1 to obtain the weight w*q1 and the offset b*q1 of the last layer in the second probability distribution estimation network. It should be noted that a network layer other than the last layer in the second probability distribution estimation network is the same as a network layer in the first probability distribution estimation network. In other words, a difference between the second probability distribution estimation network and the first probability distribution estimation network lies in that network parameters of the last layers are different. In this way, the first probability distribution estimation network may be obtained through training based on the unquantized image feature. After the training on the first probability distribution estimation network is completed, the second probability distribution estimation network may be obtained by multiplying the network parameter of the last layer in the first probability distribution estimation network by the first quantization step.

Similar to the first hyperprior feature in step 404 in the embodiment of FIG. 4, in this embodiment of this disclosure, the first hyperprior feature is a quantized hyperprior feature, or may be an unquantized hyperprior feature. Based on this, in an implementation in which the first hyperprior feature is a quantized hyperprior feature, the encoder side inversely quantizes the first hyperprior feature based on a third quantization step to obtain a second hyperprior feature, and inputs the second hyperprior feature into the second probability distribution estimation network to obtain the second probability distribution parameter. When the first hyperprior feature is an unquantized hyperprior feature, the encoder side inputs the first hyperprior feature into the second probability distribution estimation network to obtain the second probability distribution parameter.

In addition to the foregoing implementations of determining the second probability distribution parameter, the encoder side may alternatively determine the second probability distribution parameter based on a context feature, to improve accuracy of the second probability distribution parameter. This is described below.

In an implementation, the encoder side inputs the third image feature of the image into a context network to obtain a context feature of the third image feature. The third image feature is an image feature obtained by inversely quantizing the first image feature based on the first quantization step. The encoder side determines a first prior feature based on the first hyperprior feature, and inputs the first prior feature and the context feature into the second probability distribution estimation network to obtain the second probability distribution parameter. That is, the encoder side extracts a context feature from an inversely quantized image feature to determine a second probability distribution parameter based on the context feature and a first prior feature.

In another implementation, the encoder side inputs the first image feature into a context network to obtain a context feature of the first image feature. The encoder side determines a first prior feature based on the first hyperprior feature, and quantizes the first prior feature based on a second quantization step to obtain a second prior feature. The encoder side inputs the second prior feature and the context feature into the second probability distribution estimation network to obtain the second probability distribution parameter. That is, the encoder side extracts a context feature from a quantized image feature, and then obtains a second prior feature by adding a quantization operation on a first prior feature, to determine a second probability distribution parameter based on the second prior feature and the context feature. The second quantization step is the same as or different from the first quantization step.

It should be noted that a specific implementation process of step 1104 is similar to the specific implementation process of step 404 in the embodiment in FIG. 4. For details, refer to the related descriptions in step 404. Details are not described herein again.

Step 1105: Encode the first image feature into the bitstream based on the second probability distribution parameter.

In this embodiment of this disclosure, the second probability distribution parameter includes probability distribution parameters of a plurality of feature points, and the encoder side encodes an image feature of each feature point in the first image feature into the bitstream based on a probability distribution parameter of each feature point in the second probability distribution parameter. For example, the encoder side encodes the second image feature into the bitstream through entropy encoding.

It should be noted that, it is assumed that the probability distribution estimation network in the encoding and decoding procedures shown in FIG. 6 to FIG. 10 is referred to as the first probability distribution estimation network. In this case, when the first probability distribution estimation network in FIG. 6 to FIG. 10 is replaced with the second probability distribution estimation network, and after a quantization operation on a probability distribution parameter is removed, a flowchart of the encoding and decoding method consistent with that in the embodiment in FIG. 11 is obtained.

In conclusion, in an encoding process in this embodiment of this disclosure, a hyperprior feature of the unquantized image feature is also determined, but the second probability distribution parameter is directly obtained subsequently via the second probability distribution estimation network. The second probability distribution estimation network is obtained by processing the network parameter in the first probability distribution estimation network based on the first quantization step. It can be learned that only the first probability distribution estimation network (for determining a probability distribution parameter of the unquantized image feature) needs to be obtained through training in this solution. Even in a multi-bit-rate scenario, a numerical range of the unquantized image feature is stable and is not affected by a quantization step, in other words, an input numerical range of the first probability distribution estimation network does not change with a bit rate. Therefore, training on the first probability distribution estimation network is less difficult and stable, and the first probability distribution estimation network with good performance can be obtained through training. This helps improve encoding and decoding performance.

The following describes the decoding methods provided in embodiments of this disclosure. It should be noted that the following decoding method shown in FIG. 12 matches the foregoing encoding method shown in FIG. 4, and the following decoding method shown in FIG. 13 matches the foregoing encoding method shown in FIG. 11.

Figure 12:
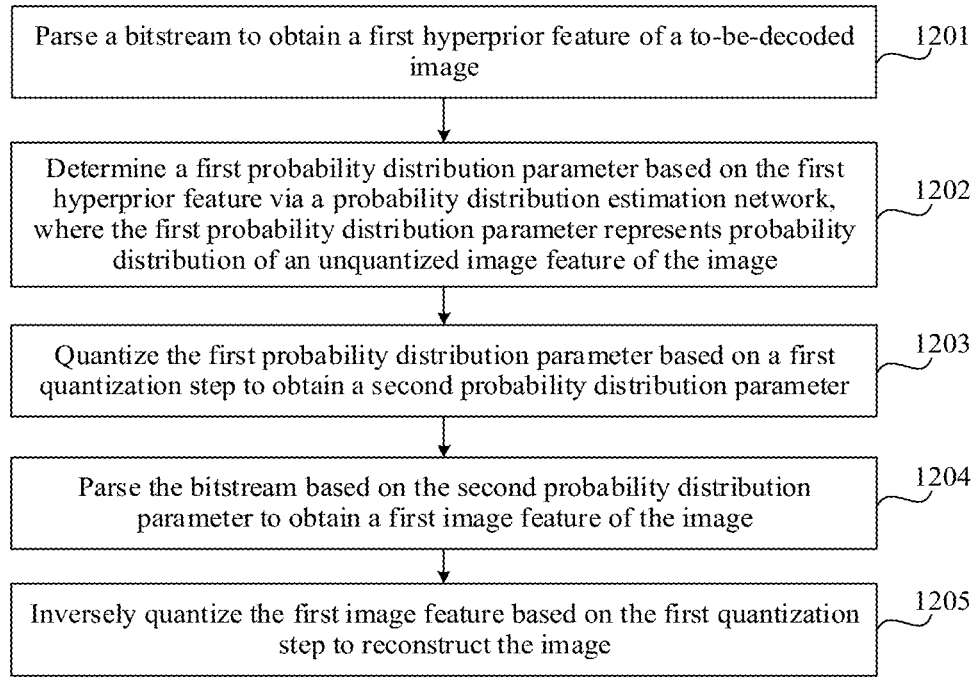
FIG. 12 is a flowchart of a decoding method according to an embodiment of this disclosure.

FIG. 12 is a flowchart of a decoding method according to an embodiment of this disclosure. The method is applied to a decoder side. Refer to FIG. 12. The method includes the following steps.

Step 1201: Parse a bitstream to obtain a first hyperprior feature of a to-be-decoded image.

In this embodiment of this disclosure, the decoder side first parses the bitstream to obtain the first hyperprior feature of the to-be-decoded image. Optionally, the decoder side parses the bitstream to obtain the first hyperprior feature through entropy decoding. For example, the decoder side parses, based on a specified probability distribution parameter, the bitstream through entropy decoding to obtain the first hyperprior feature. The specified probability distribution parameter is a probability distribution parameter determined in advance via a probability distribution estimation network. A network structure, a training method, and the like of the probability distribution estimation network are not limited in embodiments of this disclosure. It should be noted that the first hyperprior feature includes hyperprior features of a plurality of feature points. The first hyperprior feature obtained by the decoder side through parsing is consistent with a first hyperprior feature determined by an encoder side. In other words, the first hyperprior feature obtained by the decoder side is the first hyperprior feature of the second image feature described in the embodiment in FIG. 4, or the first hyperprior feature of the third image feature. The second image feature is an unquantized image feature, and the third image feature is an inversely quantized image feature.

Step 1202: Determine a first probability distribution parameter based on the first hyperprior feature via a probability distribution estimation network, where the first probability distribution parameter represents probability distribution of an unquantized image feature of the image.

In this embodiment of this disclosure, the first hyperprior feature includes the hyperprior features of the plurality of feature points, and the first probability distribution parameter includes probability distribution parameters of the plurality of feature points. The decoder side determines a probability distribution parameter of each feature point in the first probability distribution parameter based on a hyperprior feature of each feature point in the first hyperprior feature via the probability distribution estimation network.

It should be noted that, in an implementation in which encoding and decoding are not performed via a context network, the decoder side may decode the plurality of feature points in parallel. In an implementation in which encoding and decoding are performed via a context network, the decoder side cannot decode the plurality of feature points at the same time. For example, the decoder side sequentially decodes the plurality of feature points; the decoder side sequentially decodes feature points of a channel; the decoder side sequentially decodes a plurality of groups of feature points, where quantities of feature points in all the groups may be different; or the decoder side decodes the plurality of feature points in another order.

In addition, it can be learned from the foregoing descriptions that the first hyperprior feature is a quantized hyperprior feature, or may be an unquantized hyperprior feature. Based on this, in an implementation in which encoding and decoding are not performed via the context network, and the first hyperprior feature is a quantized hyperprior feature, the decoder side inversely quantizes the first hyperprior feature based on a third quantization step to obtain a second hyperprior feature, and inputs the second hyperprior feature into the probability distribution estimation network to obtain the first probability distribution parameter. In an implementation in which encoding and decoding are not performed via the context network, and the first hyperprior feature is an unquantized hyperprior feature, the decoder side inputs the first hyperprior feature into the probability distribution estimation network to obtain the first probability distribution parameter.

In the implementation in which encoding and decoding are performed via the context network, it is assumed that a first feature point is any one of the plurality of feature points. In this case, the decoder side performs the following operations on the first feature point to determine a probability distribution parameter of the first feature point: determining a context feature of the first feature point based on image features of decoded feature points in a first image feature; determining a first prior feature of the first feature point based on the hyperprior feature of the first feature point; and determining the probability distribution parameter of the first feature point based on the first prior feature of the first feature point and the context feature of the first feature point via the probability distribution estimation network, that is, determining the probability distribution parameter of the first feature point in the first probability distribution parameter.

In the implementation in which the first hyperprior feature is a quantized hyperprior feature, the decoder side inversely quantizes, based on the third quantization step, the first hyperprior feature obtained through parsing to obtain the second hyperprior feature, and inputs the second hyperprior feature into a hyper decoder network to obtain a first prior feature of each feature point in the plurality of feature points. For the first feature point, the decoder side inversely quantizes the hyperprior feature of the first feature point in the first hyperprior feature to obtain a hyperprior feature of a first feature point in the second hyperprior feature, and inputs the hyperprior feature of the first feature point in the second hyperprior feature into the hyper decoder network to obtain the first prior feature of the first feature point. In the implementation in which the first hyperprior feature is a quantized hyperprior feature, the decoder side inputs the first hyperprior feature obtained through parsing into the hyper decoder network to obtain the first prior feature of each feature point in the plurality of feature points. For the first feature point, the decoder side inputs the hyperprior feature of the first feature point in the first hyperprior feature into the hyper decoder network to obtain the first prior feature of the first feature point.

Optionally, an implementation process in which the decoder side determines the context feature of the first feature point based on the image features of the decoded feature points in the first image feature is as follows: the decoder side determines a surrounding feature point of the first feature point from the decoded feature points, and inversely quantizes an image feature of the surrounding feature point in the first image feature based on a first quantization step to obtain a surrounding feature of the first feature point. Then, the decoder side inputs the surrounding feature of the first feature point into the context network to obtain the context feature of the first feature point. Correspondingly, an implementation process in which the decoder side determines the probability distribution parameter of the first feature point in the first probability distribution parameter based on the first prior feature of the first feature point and the context feature of the first feature point via the probability distribution estimation network is as follows: the decoder side inputs the first prior feature of the first feature point and the context feature of the first feature point into the probability distribution estimation network to obtain the probability distribution parameter of the first feature point in the first probability distribution parameter. That is, the decoder side extracts a context feature from an inversely quantized image feature to determine a first probability distribution parameter based on the context feature and a first prior feature. The surrounding feature point of the first feature point includes one or more feature points in a neighborhood of the first feature point.

Optionally, another implementation process in which the decoder side determines the context feature of the first feature point based on the image features of the decoded feature points in the first image feature is as follows: the decoder side determines a surrounding feature point of the first feature point from the decoded feature points, and inputs an image feature of the surrounding feature point in the first image feature into the context network to obtain the context feature of the first feature point. Correspondingly, an implementation process in which the decoder side determines the probability distribution parameter of the first feature point in the first probability distribution parameter based on the first prior feature of the first feature point and the context feature of the first feature point via the probability distribution estimation network is as follows: the decoder side quantizes the first prior feature of the first feature point based on a second quantization step to obtain a second prior feature of the first feature point, and inputs the second prior feature of the first feature point and the context feature of the first feature point into the probability distribution estimation network to obtain the probability distribution parameter of the first feature point in the first probability distribution parameter. That is, a decoder side extracts a context feature from a quantized image feature, and then obtains a second prior feature by adding a quantization operation on a first prior feature, to determine a first probability distribution parameter based on the second prior feature and the context feature. The second quantization step is the same as or different from the first quantization step.

It should be noted that, in the implementation in which encoding and decoding are performed via the context network, an implementation in which the decoder side determines the first prior feature of the first feature point is similar to related content in the foregoing embodiment. Details are not described herein again. In addition, the image features of the decoded feature points in the first image feature are obtained by decoding the bitstream according to step 1202 to the following step 1204. To be specific, in the implementation in which encoding and decoding are performed via the context network, the decoder side parses the bitstream according to step 1202 to step 1204 to sequentially obtain image features of all feature points in the first image feature, where the decoder side may decode at least one feature point each time. In addition, the first image feature is an image feature obtained by quantizing the second image feature of the image based on the first quantization step, the quantization operation is performed in an encoding process, and the second image feature is an image feature obtained in the encoding process.

Step 1203: Quantize the first probability distribution parameter based on the first quantization step to obtain a second probability distribution parameter.

The second probability distribution parameter is probability distribution of a plurality of feature points. After obtaining the probability distribution parameter of the first feature point in the first probability distribution parameter through decoding, the decoder side quantizes the probability distribution parameter of the first feature point in the first probability distribution parameter based on the first quantization step to obtain the probability distribution parameter of the first feature point in the second probability distribution parameter. It should be noted that, in the implementation in which encoding and decoding are not performed via the context network, the decoder side may quantize the probability distribution parameters of the plurality of feature points in the first probability distribution parameter in parallel. In the implementation in which encoding and decoding are performed via the context network, each time the decoder side obtains a probability distribution parameter of at least one feature point in the first probability distribution parameter, the decoder side quantizes the probability distribution parameter of the at least one feature point in the first probability distribution parameter.

Step 1204: Parse the bitstream based on the second probability distribution parameter to obtain the first image feature of the image.

After obtaining the probability distribution parameter of the first feature point in the second probability distribution parameter, the decoder side parses the bitstream based on the probability distribution parameter of the first feature point in the second probability distribution parameter to obtain an image feature of the first feature point in the first image feature. Optionally, the decoder side parses the bitstream through entropy decoding to obtain an image feature of each feature point in the first image feature. It should be noted that, in the implementation in which encoding and decoding are not performed via the context network, the decoder side may parse the plurality of feature points in parallel to obtain the first image feature. In the implementation in which encoding and decoding are performed via the context network, each time the decoder side obtains a probability distribution parameter of at least one feature point in the second probability distribution parameter, the decoder side parses the bitstream to obtain an image feature of the at least one feature point in the first image feature, and obtains the first image feature of the image until the image features of all the feature points in the first image feature are obtained through parsing.

Step 1205: Inversely quantize the first image feature based on the first quantization step to reconstruct the image.

In this embodiment of this disclosure, after parsing the bitstream to obtain the first image feature, the decoder side inversely quantizes the first image feature based on the first quantization step to obtain the third image feature of the image, and reconstructs the image based on the third image feature. Optionally, the decoder side inputs the third image feature into a decoder network to reconstruct the image. A decoding process performed in the decoder network is an inverse process of feature extraction performed in the image feature extraction network. It should be noted that the third image feature is consistent with a third image feature in the encoding process, and both the third image features are inversely quantized image features.

Optionally, in some other embodiments, the decoder side inversely quantizes the first image feature based on a fourth quantization step to obtain a fourth image feature of the image, and reconstructs the image based on the fourth image feature. The fourth quantization step may be different from the first quantization step.

The following describes the foregoing decoding process again with reference to FIG. 6 to FIG. 10.

In a decoding process of the encoding and decoding method shown in FIG. 6, the bitstream is parsed to obtain the hyperprior feature $\hat{z}$, and the hyperprior feature $\hat{z}$ is inversely quantized based on the quantization step q2 to obtain the hyperprior feature z. Then, the hyperprior feature z is input into the probability distribution estimation network to obtain the probability distribution parameters $\mu$ and $\sigma$ of each feature element in the feature map y. The probability distribution parameters $\mu$ and $\sigma$ are quantized based on the quantization step q1 to obtain the probability distribution parameters $\mu_s$ and $\sigma_s$ of each feature element in the feature map $\hat{y}_s$. The bitstream is parsed based on the probability distribution parameters $\mu_s$ and $\sigma_s$ of each feature element in the feature map $\hat{y}_s$ to obtain the feature map $\hat{y}_s$. The feature map $\hat{y}_s$ is inversely quantized based on the quantization step q1 to obtain a feature map $\hat{y}$. Finally, the feature map $\hat{y}$ is input into the decoder (Dec) network to reconstruct the image.

In a decoding process of the encoding and decoding method shown in FIG. 7, the bitstream is parsed to obtain a hyperprior feature $\hat{z}$ of each feature point in the plurality of feature points, and the hyperprior feature $\hat{z}$ of each feature point is inversely quantized based on the quantization step q2 to obtain a hyperprior feature z of each feature point. Then, the hyperprior feature z of each feature point is input into the hyper decoder network to obtain a prior feature φ of each feature point. Then, for the to-be-decoded first feature point, the surrounding feature point of the first feature point is determined from the decoded feature points. A feature value of the surrounding feature point in the feature map $\hat{y}_s$ is inversely quantized based on the quantization step q1 to obtain a feature value of the surrounding feature point in the feature map ŷ, in other words, obtain the surrounding feature of the first feature point. The feature value of the surrounding feature point in the feature map ŷ is input into the context network to obtain the context feature of the first feature point. The context feature of the first feature point and the prior feature of the first feature point are input into the probability distribution estimation network to obtain probability distribution estimation parameters μ and σ of the first feature point. The probability distribution estimation parameters μ and σ of the first feature point are quantized based on the first quantization step to obtain probability distribution estimation parameters $\mu_s$ and $\delta_s$ of the first feature point. The bitstream is parsed based on the probability distribution estimation parameters $\mu_s$ and $\sigma_s$ of the first feature point to obtain an image feature of the first feature point in the feature map $\hat{y}_s$. When image features of all feature points in the feature map $\hat{y}_s$ are obtained by parsing the bitstream, the feature map $\hat{y}_s$ is obtained. Then, each feature element in the feature map $\hat{y}_s$ is inversely quantized based on the quantization step q1 to obtain the feature map ŷ. Finally, the feature map ŷ is input into the decoder network to reconstruct the image.

A decoding process of the encoding and decoding method shown in FIG. 8 is the same as the decoding process of the encoding and decoding method shown in FIG. 6. A decoding process of the encoding and decoding method shown in FIG. 9 is the same as the decoding process of the encoding and decoding method shown in FIG. 7. A difference between a decoding process of the encoding and decoding method shown in FIG. 10 and the decoding processes in FIG. 7 and FIG. 9 lies in that, after the prior feature φ is obtained via the hyper decoder network, a quantization operation is added, to be specific, the prior feature φ is quantized based on the quantization step q3 to obtain the prior feature $φ_s$. The context feature of each feature point and the prior feature $φ_s$ are input into the probability distribution estimation network to obtain the first probability distribution parameters μ and σ.

In conclusion, in this embodiment of this disclosure, to obtain a probability distribution parameter of the quantized image feature, in a decoding process, a first probability distribution parameter is determined via the probability distribution estimation network, where the first probability distribution parameter represents the probability distribution of the unquantized image feature. Then, the first probability distribution parameter is quantized based on the first quantization step (that is, a quantization step for quantizing an image feature), to obtain a second probability distribution parameter for representing probability distribution of the quantized image feature. It can be learned that only the probability distribution estimation network for determining the probability distribution parameter of the unquantized image feature needs to be obtained through training in this solution. Even in a multi-bit-rate scenario, a numerical range of the unquantized image feature is stable and is not affected by a quantization step, in other words, an input numerical range of the probability distribution estimation network does not change with a bit rate. Therefore, training on the probability distribution estimation network is less difficult and stable, and the probability distribution estimation network with good performance can be obtained through training. This helps improve encoding and decoding performance.

Figure 13:
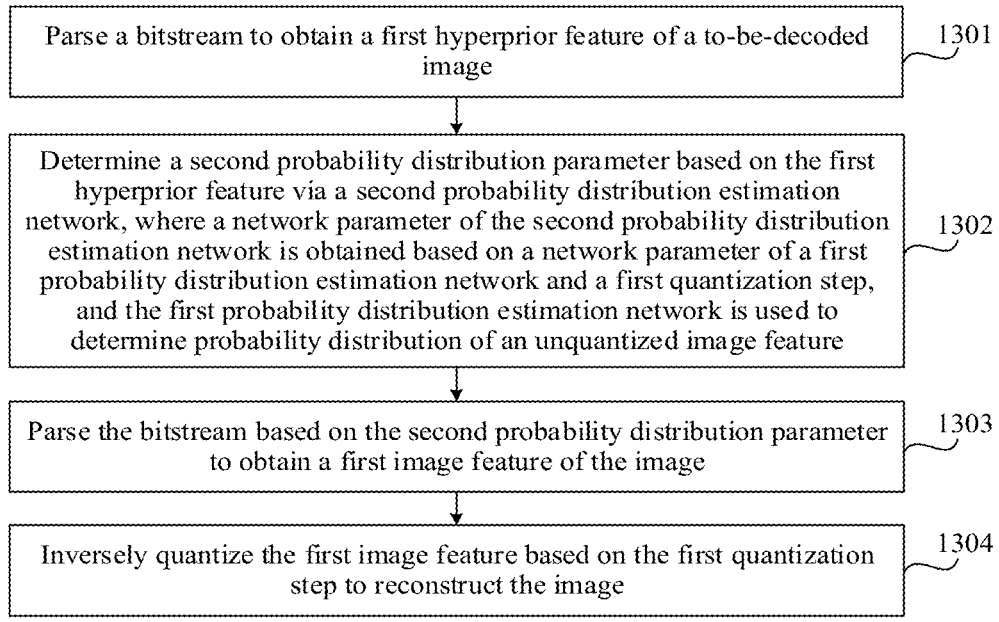
FIG. 13 is a flowchart of another decoding method according to an embodiment of this disclosure.

FIG. 13 is a flowchart of another decoding method according to an embodiment of this disclosure. The method is applied to a decoder side. Refer to FIG. 13. The method includes the following steps.

Step 1301: Parse a bitstream to obtain a first hyperprior feature of a to-be-decoded image.

It should be noted that a specific implementation process of step 1301 is the same as the specific implementation process of step 1201 in the embodiment in FIG. 12. For details, refer to the related descriptions in step 1201. Details are not described herein again.

Step 1302: Determine a second probability distribution parameter based on the first hyperprior feature via a second probability distribution estimation network, where a network parameter of the second probability distribution estimation network is obtained based on a network parameter of a first probability distribution estimation network and a first quantization step, and the first probability distribution estimation network is used to determine probability distribution of an unquantized image feature.

Optionally, a last layer in the first probability distribution estimation network is a convolutional layer, and network parameters of the convolutional layer include a weight and an offset. Based on this, a weight and an offset of a last layer (convolutional layer) in the second probability distribution estimation network are obtained based on the weight and the offset of the last layer (convolutional layer) in the first probability distribution estimation network and the first quantization step. Optionally, the second probability distribution estimation network is obtained by multiplying a network parameter of the last layer in the first probability distribution estimation network by the first quantization step. Alternatively, in some embodiments, the second probability distribution estimation network is obtained by adjusting the network parameter of the last layer in the first probability distribution estimation network in a manner of binary leftward displacement or rightward displacement, so that an adjusted network parameter is equal to the network parameter obtained before adjustment multiplied by the first quantization step.

In this embodiment of this disclosure, the first hyperprior feature includes hyperprior features of a plurality of feature points, and the second probability distribution parameter includes probability distribution parameters of the plurality of feature points. The decoder side determines a probability distribution parameter of each feature point in the second probability distribution parameter based on a hyperprior feature of each feature point in the first hyperprior feature via the second probability distribution estimation network.

It should be noted that, in an implementation in which encoding and decoding are not performed via a context network, the decoder side may decode the plurality of feature points in parallel. In an implementation in which encoding and decoding are performed via a context network, the decoder side cannot decode the plurality of feature points at the same time.

In addition, it can be learned from the foregoing descriptions that the first hyperprior feature is a quantized hyperprior feature, or may be an unquantized hyperprior feature. Based on this, in an implementation in which encoding and decoding are not performed via the context network, and the first hyperprior feature is a quantized hyperprior feature, the decoder side inversely quantizes the first hyperprior feature based on a third quantization step to obtain a second hyperprior feature, and inputs the second hyperprior feature into the second probability distribution estimation network to obtain the second probability distribution parameter. In an implementation in which encoding and decoding are not performed via the context network, and the first hyperprior feature is an unquantized hyperprior feature, the decoder side inputs the first hyperprior feature into the second probability distribution estimation network to obtain the second probability distribution parameter.

In the implementation in which encoding and decoding are performed via the context network, it is assumed that a first feature point is any one of the plurality of feature points. In this case, the decoder side performs the following operations on the first feature point to determine a probability distribution parameter of the first feature point in the second probability distribution parameter: determining a context feature of the first feature point based on image features of decoded feature points in a first image feature; determining a first prior feature of the first feature point based on a hyperprior feature of the first feature point in the first hyperprior feature; and determining the probability distribution parameter of the first feature point in the second probability distribution parameter based on the first prior feature of the first feature point and the context feature of the first feature point via the second probability distribution estimation network.

In an implementation in which the first hyperprior feature is a quantized hyperprior feature, the decoder side inversely quantizes, based on the third quantization step, the first hyperprior feature obtained through parsing to obtain the second hyperprior feature, and inputs the second hyperprior feature into a hyper decoder network to obtain a first prior feature of each feature point in the plurality of feature points. In an implementation in which the first hyperprior feature is a quantized hyperprior feature, the decoder side inputs the first hyperprior feature obtained through parsing into a hyper decoder network to obtain a first prior feature of each feature point in the plurality of feature points.

Optionally, an implementation process in which the decoder side determines the context feature of the first feature point based on the image features of the decoded feature points in the first image feature is as follows: the decoder side determines a surrounding feature point of the first feature point from the decoded feature points, and inversely quantizes an image feature of the surrounding feature point in the first image feature based on the first quantization step to obtain a surrounding feature of the first feature point. Then, the decoder side inputs the surrounding feature of the first feature point into the context network to obtain the context feature of the first feature point. Correspondingly, an implementation process in which the decoder side determines the probability distribution parameter of the first feature point in the second probability distribution parameter based on the first prior feature of the first feature point and the context feature of the first feature point via the second probability distribution estimation network is as follows: the decoder side inputs the first prior feature of the first feature point and the context feature of the first feature point into the second probability distribution estimation network to obtain the probability distribution parameter of the first feature point in the second probability distribution parameter. That is, the decoder side extracts a context feature from an inversely quantized image feature to determine a second probability distribution parameter based on the context feature and a first prior feature. The surrounding feature point of the first feature point includes one or more feature points in a neighborhood of the first feature point.

Optionally, another implementation process in which the decoder side determines the context feature of the first feature point based on the image features of the decoded feature points in the first image feature is as follows: the decoder side determines a surrounding feature point of the first feature point from the decoded feature points, and inputs an image feature of the surrounding feature point in the first image feature into the context network to obtain the context feature of the first feature point. Correspondingly, an implementation process in which the decoder side determines the probability distribution parameter of the first feature point in the second probability distribution parameter based on the first prior feature of the first feature point and the context feature of the first feature point via the second probability distribution estimation network is as follows: the decoder side quantizes the first prior feature of the first feature point based on a second quantization step to obtain a second prior feature of the first feature point, and inputs the second prior feature of the first feature point and the context feature of the first feature point into the second probability distribution estimation network to obtain the probability distribution parameter of the first feature point in the second probability distribution parameter. That is, a decoder side extracts a context feature from a quantized image feature, and then obtains a second prior feature by adding a quantization operation on a first prior feature, to determine a first probability distribution parameter based on the second prior feature and the context feature. The second quantization step is the same as or different from the first quantization step.

It should be noted that, in the implementation in which encoding and decoding are performed via the context network, an implementation in which the decoder side determines the first prior feature of the first feature point is similar to related content in the foregoing embodiment. Details are not described herein again. In addition, the image features of the decoded feature points in the first image feature are obtained by decoding the bitstream according to step 1302 to the following step 1304. To be specific, in the implementation in which encoding and decoding are performed via the context network, the decoder side parses the bitstream according to step 1302 to step 1304 to sequentially obtain image features of all feature points in the first image feature, where the decoder side may decode at least one feature point each time. In addition, the first image feature is an image feature obtained by quantizing a second image feature of the image based on the first quantization step, the quantization operation is performed in an encoding process, and the second image feature is an image feature obtained in the encoding process.

Step 1303: Parse the bitstream based on the second probability distribution parameter to obtain the first image feature of the image.

After obtaining the probability distribution parameter of the first feature point in the second probability distribution parameter, the decoder side parses the bitstream based on the probability distribution parameter of the first feature point in the second probability distribution parameter to obtain an image feature of the first feature point in the first image feature. Optionally, the decoder side parses the bitstream through entropy decoding to obtain an image feature of each feature point in the first image feature. It should be noted that, in the implementation in which encoding and decoding are not performed via the context network, the decoder side may parse the plurality of feature points in parallel to obtain the first image feature. In the implementation in which encoding and decoding are performed via the context network, each time the decoder side obtains a probability distribution parameter of at least one feature point in the second probability distribution parameter, the decoder side parses the bitstream to obtain an image feature of the at least one feature point in the first image feature, and obtains the first image feature of the image until the image features of all the feature points in the first image feature are obtained through parsing.

It should be noted that the first image feature obtained by the decoder side is consistent with a first image feature obtained by an encoder side, and the first image feature obtained by the encoder side is an image feature obtained by quantizing the second image feature of the image based on the first quantization step.

Step 1304: Inversely quantize the first image feature based on the first quantization step to reconstruct the image.

In this embodiment of this disclosure, after parsing the bitstream to obtain the first image feature, the decoder side inversely quantizes the first image feature based on the first quantization step to obtain a third image feature of the image, and reconstructs the image based on the third image feature. Optionally, the decoder side inputs the third image feature into a decoder network to reconstruct the image. A decoding process performed in the decoder network is an inverse process of feature extraction performed in the image feature extraction network. It should be noted that the third image feature is consistent with a third image feature in the encoding process, and both the third image features are inversely quantized image features.

It should be noted that, it is assumed that the probability distribution estimation network in the encoding and decoding procedures shown in FIG. 6 to FIG. 10 is referred to as the first probability distribution estimation network. In this case, when the first probability distribution estimation network in FIG. 6 to FIG. 10 is replaced with the second probability distribution estimation network, and after a quantization operation on a probability distribution parameter is removed, a flowchart of the encoding and decoding method consistent with that in the embodiment in FIG. 13 is obtained.

In conclusion, in a decoding process in this embodiment of this disclosure, the second probability distribution parameter is directly obtained via the second probability distribution estimation network. The second probability distribution estimation network is obtained by processing the network parameter in the first probability distribution estimation network based on the first quantization step, and the first probability distribution estimation network is used to determine a probability distribution parameter of the unquantized image feature. It can be learned that only the first probability distribution estimation network (for determining the probability distribution parameter of the unquantized image feature) needs to be obtained through training in this solution. Even in a multi-bit-rate scenario, a numerical range of the unquantized image feature is stable and is not affected by a quantization step, in other words, an input numerical range of the first probability distribution estimation network does not change with a bit rate. Therefore, training on the first probability distribution estimation network is less difficult and stable, and the first probability distribution estimation network with good performance can be obtained through training. This helps improve encoding and decoding performance.

In addition, after the encoding and decoding methods provided in embodiments of this disclosure are verified through a plurality of experiments, it is concluded that, in this solution, an image in a YUV format can achieve encoding and decoding performance improvements on three components: Y, U, and V. It can be learned from the foregoing embodiment in FIG. 4 that, according to the encoding and decoding method provided in this solution, after probability distribution estimation is performed once on the unquantized image feature to obtain the first probability distribution parameter, second probability distribution parameters at different bit rates (corresponding to different first quantization steps) may be deduced. There is no need to perform probability estimation for each bit rate. It can be learned that this solution can reduce operation complexity of probability estimation, and facilitate rate-distortion optimization (RDO) of a feature map. Probability estimation is unified for different bit rates, which facilitates training on the probability distribution estimation network.

Figure 14:
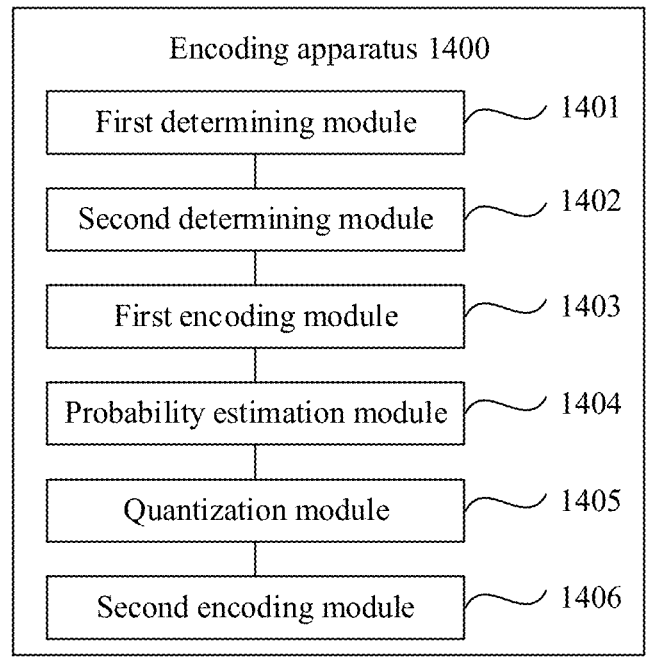
FIG. 14 is a diagram of a structure of an encoding apparatus according to an embodiment of this disclosure.

FIG. 14 is a diagram of a structure of an encoding apparatus 1400 according to an embodiment of this disclosure. The encoding apparatus 1400 may be implemented as a part of an encoder-side device or an entire encoder-side device by using software, hardware, or a combination thereof. The encoder-side device may be any encoder side shown in FIG. 1 to FIG. 3. Refer to FIG. 14. The apparatus 1400 includes a first determining module 1401, a second determining module 1402, a first encoding module 1403, a probability estimation module 1404, a quantization module 1405, and a second encoding module 1406.

The first determining module 1401 is configured to determine a first image feature and a second image feature of a to-be-encoded image, where the first image feature is an image feature obtained by quantizing the second image feature based on a first quantization step.

The second determining module 1402 is configured to determine a first hyperprior feature of the second image feature.

The first encoding module 1403 is configured to encode the first hyperprior feature into a bitstream.

The probability estimation module 1404 is configured to determine a first probability distribution parameter based on the first hyperprior feature via a probability distribution estimation network.

The quantization module 1405 is configured to quantize the first probability distribution parameter based on the first quantization step to obtain a second probability distribution parameter.

The second encoding module 1406 is configured to encode the first image feature into the bitstream based on the second probability distribution parameter.

Optionally, the second determining module 1402 includes: a first hyper encoder submodule, configured to input the second image feature into a hyper encoder network to obtain the first hyperprior feature.

Optionally, the second determining module 1402 includes: an inverse quantization submodule, configured to inversely quantize the first image feature based on the first quantization step to obtain a third image feature of the image; and a second hyper encoder submodule, configured to input the third image feature into a hyper encoder network to obtain the first hyperprior feature.

Optionally, the probability estimation module 1404 includes: a context submodule, configured to input the third image feature of the image into a context network to obtain a context feature of the third image feature, where the third image feature is an image feature obtained by inversely quantizing the first image feature based on the first quantization step; a first determining submodule, configured to determine a first prior feature based on the first hyperprior feature; and a first probability estimation submodule, configured to input the first prior feature and the context feature into the probability distribution estimation network to obtain the first probability distribution parameter.

Optionally, the probability estimation module 1404 includes: a context submodule, configured to input the first image feature into a context network to obtain a context feature of the first image feature; a second determining submodule, configured to determine a first prior feature based on the first hyperprior feature; a quantization submodule, configured to quantize the first prior feature based on a second quantization step to obtain a second prior feature; and a second probability estimation submodule, configured to input the second prior feature and the context feature into the probability distribution estimation network to obtain the first probability distribution parameter.

In this embodiment of this disclosure, to obtain a probability distribution parameter of a quantized image feature, in an encoding process, a first probability distribution parameter is determined based on a hyperprior feature of an unquantized image feature via the probability distribution estimation network, where the first probability distribution parameter represents probability distribution of the unquantized image feature. Then, the first probability distribution parameter is quantized based on the first quantization step (that is, a quantization step for quantizing an image feature), to obtain a second probability distribution parameter for representing probability distribution of the quantized image feature. It can be learned that only the probability distribution estimation network for determining a probability distribution parameter of the unquantized image feature needs to be obtained through training in this solution. Even in a multi-bit-rate scenario, a numerical range of the unquantized image feature is stable and is not affected by a quantization step, in other words, an input numerical range of the probability distribution estimation network does not change with a bit rate. Therefore, training on the probability distribution estimation network is less difficult and stable, and the probability distribution estimation network with good performance can be obtained through training. This helps improve encoding and decoding performance.

It should be noted that, during encoding by the encoding apparatus provided in the foregoing embodiment, division into the foregoing functional modules is merely used as an example for description. In actual application, the foregoing functions may be allocated to different functional modules and implemented based on a requirement. To be specific, an internal structure of the apparatus is divided into different functional modules to implement all or some of the functions described above. In addition, the encoding apparatus provided in the foregoing embodiment and the encoding method embodiment belong to a same concept. For details about a specific implementation process of the encoding apparatus, refer to the method embodiment. Details are not described herein again.

Figure 15:
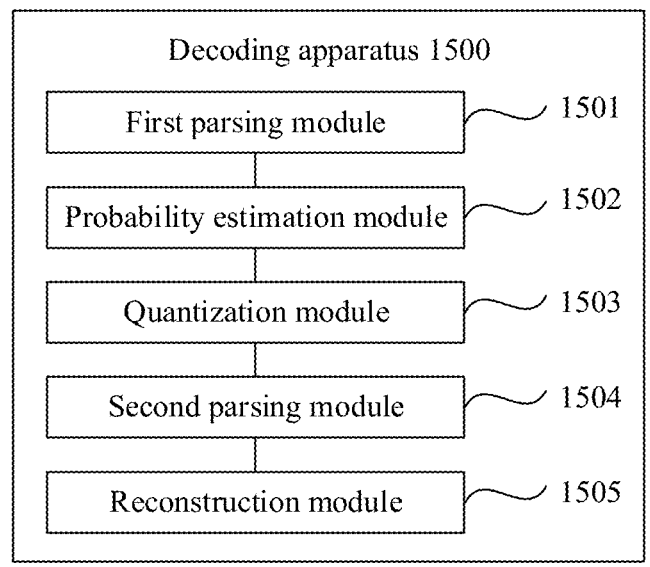
FIG. 15 is a diagram of a structure of a decoding apparatus according to an embodiment of this disclosure.

FIG. 15 is a diagram of a structure of a decoding apparatus 1500 according to an embodiment of this disclosure. The decoding apparatus 1500 may be implemented as a part of a decoder-side device or an entire decoder-side device by using software, hardware, or a combination thereof. The decoder-side device may be any decoder side shown in FIG. 1 to FIG. 3. Refer to FIG. 15. The apparatus 1500 includes a first parsing module 1501, a probability estimation module 1502, a quantization module 1503, a second parsing module 1504, and a reconstruction module 1505.

The first parsing module 1501 is configured to parse a bitstream to obtain a first hyperprior feature of a to-be-decoded image.

The probability estimation module 1502 is configured to determine a first probability distribution parameter based on the first hyperprior feature via a probability distribution estimation network, where the first probability distribution parameter represents probability distribution of an unquantized image feature of the image.

The quantization module 1503 is configured to quantize the first probability distribution parameter based on a first quantization step to obtain a second probability distribution parameter.

The second parsing module 1504 is configured to parse the bitstream based on the second probability distribution parameter to obtain a first image feature of the image.

The reconstruction module 1505 is configured to inversely quantize the first image feature based on the first quantization step to reconstruct the image.

Optionally, the first image feature is an image feature obtained by quantizing a second image feature of the image based on the first quantization step.

Optionally, the reconstruction module 1505 includes: an inverse quantization submodule, configured to inversely quantize the first image feature based on the first quantization step to obtain a third image feature of the image; and a reconstruction submodule, configured to reconstruct the image based on the third image feature.

Optionally, the first probability distribution parameter includes probability distribution parameters of a plurality of feature points, and the first hyperprior feature includes hyperprior features of the plurality of feature points. The probability estimation module 1502 includes a context submodule, a first determining submodule, and a probability estimation submodule.

For a first feature point, a probability distribution parameter of the first feature point is determined via the context submodule, the first determining submodule, and the probability estimation submodule, where the first feature point is any one of the plurality of feature points.

The context submodule is configured to determine a context feature of the first feature point based on image features of decoded feature points in the first image feature.

The first determining submodule is configured to determine a first prior feature of the first feature point based on a hyperprior feature of the first feature point.

The probability estimation submodule is configured to determine the probability distribution parameter of the first feature point based on the first prior feature of the first feature point and the context feature of the first feature point via the probability distribution estimation network.

Optionally, the context submodule is configured to: determine a surrounding feature point of the first feature point from the decoded feature points; inversely quantize an image feature of the surrounding feature point in the first image feature based on the first quantization step to obtain a surrounding feature of the first feature point; and input the surrounding feature of the first feature point into a context network to obtain the context feature of the first feature point; and determining the probability distribution parameter of the first feature point based on the first prior feature of the first feature point and the context feature of the first feature point via the probability distribution estimation network includes: inputting the first prior feature of the first feature point and the context feature of the first feature point into the probability distribution estimation network to obtain the probability distribution parameter of the first feature point.

Optionally, the context submodule is configured to: determine a surrounding feature point of the first feature point from the decoded feature points; input an image feature of the surrounding feature point in the first image feature into a context network to obtain the context feature of the first feature point; and determining the probability distribution parameter of the first feature point based on the first prior feature of the first feature point and the context feature of the first feature point via the probability distribution estimation network includes: quantizing the first prior feature of the first feature point based on a second quantization step to obtain a second prior feature of the first feature point; and inputting the second prior feature of the first feature point and the context feature of the first feature point into the probability distribution estimation network to obtain the probability distribution parameter of the first feature point.

In this embodiment of this disclosure, to obtain a probability distribution parameter of a quantized image feature, in a decoding process, a first probability distribution parameter is determined via the probability distribution estimation network, where the first probability distribution parameter represents probability distribution of an unquantized image feature. Then, the first probability distribution parameter is quantized based on the first quantization step (that is, a quantization step for quantizing an image feature), to obtain a second probability distribution parameter for representing probability distribution of the quantized image feature. It can be learned that only the probability distribution estimation network for determining a probability distribution parameter of the unquantized image feature needs to be obtained through training in this solution. Even in a multi-bit-rate scenario, a numerical range of the unquantized image feature is stable and is not affected by a quantization step. Therefore, training on the probability distribution estimation network based on the unquantized image feature is less difficult and stable, and the probability distribution estimation network with good performance can be obtained through training. This helps improve encoding and decoding performance.

It should be noted that, during decoding by the decoding apparatus provided in the foregoing embodiment, division into the foregoing functional modules is merely used as an example for description. In actual application, the foregoing functions may be allocated to different functional modules and implemented based on a requirement. To be specific, an internal structure of the apparatus is divided into different functional modules to implement all or some of the functions described above. In addition, the decoding apparatus provided in the foregoing embodiment and the decoding method embodiment belong to a same concept. For details about a specific implementation process of the decoding apparatus, refer to the method embodiment. Details are not described herein again.

Figure 16:
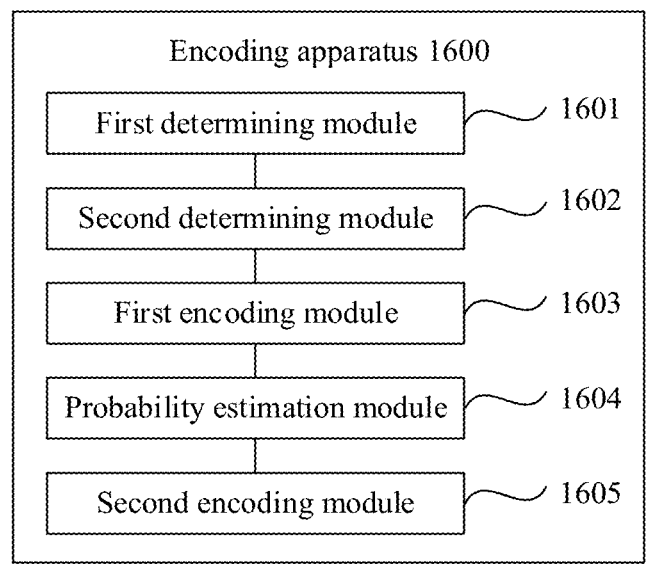
FIG. 16 is a diagram of a structure of another encoding apparatus according to an embodiment of this disclosure.

FIG. 16 is a diagram of a structure of an encoding apparatus 1600 according to an embodiment of this disclosure. The encoding apparatus 1600 may be implemented as a part of an encoder-side device or an entire encoder-side device by using software, hardware, or a combination thereof. The encoder-side device may be any encoder side shown in FIG. 1 to FIG. 3. Refer to FIG. 16. The apparatus 1600 includes a first determining module 1601, a second determining module 1602, a first encoding module 1603, a probability estimation module 1604, and a second encoding module 1605.

The first determining module 1601 is configured to determine a first image feature and a second image feature of a to-be-encoded image, where the first image feature is an image feature obtained by quantizing the second image feature based on a first quantization step.

The second determining module 1602 is configured to determine a first hyperprior feature of the second image feature.

The first encoding module 1603 is configured to encode the first hyperprior feature into a bitstream.

The probability estimation module 1604 is configured to determine a second probability distribution parameter based on the first hyperprior feature via a second probability distribution estimation network, where a network parameter of the second probability distribution estimation network is obtained based on a network parameter of a first probability distribution estimation network and the first quantization step, and the first probability distribution estimation network is used to determine probability distribution of an unquantized image feature.

The second encoding module 1605 is configured to encode the first image feature into the bitstream based on the second probability distribution parameter.

Optionally, the second probability distribution estimation network is obtained by multiplying a network parameter of a last layer in the first probability distribution estimation network by the first quantization step.

Optionally, the last layer in the first probability distribution estimation network is a convolutional layer, and network parameters of the convolutional layer include a weight and an offset.

Optionally, the second determining module 1602 includes: a first hyper encoder submodule, configured to input the second image feature into a hyper encoder network to obtain the first hyperprior feature.

Optionally, the second determining module 1602 includes: an inverse quantization submodule, configured to inversely quantize the first image feature based on the first quantization step to obtain a third image feature of the image; and a second hyper encoder submodule, configured to input the third image feature into a hyper encoder network to obtain the first hyperprior feature.

In an encoding process in this embodiment of this disclosure, a hyperprior feature of the unquantized image feature is also determined, but the second probability distribution parameter is directly obtained subsequently via the second probability distribution estimation network. The second probability distribution estimation network is obtained by processing the network parameter in the first probability distribution estimation network based on the first quantization step. It can be learned that only the first probability distribution estimation network (for determining a probability distribution parameter of the unquantized image feature) needs to be obtained through training in this solution. Even in a multi-bit-rate scenario, a numerical range of the unquantized image feature is stable and is not affected by a quantization step. Therefore, training on the first probability distribution estimation network is less difficult and stable, and the first probability distribution estimation network with good performance can be obtained through training. This helps improve encoding and decoding performance.

It should be noted that, during encoding by the encoding apparatus provided in the foregoing embodiment, division into the foregoing functional modules is merely used as an example for description. In actual application, the foregoing functions may be allocated to different functional modules and implemented based on a requirement. To be specific, an internal structure of the apparatus is divided into different functional modules to implement all or some of the functions described above. In addition, the encoding apparatus provided in the foregoing embodiment and the encoding method embodiment belong to a same concept. For details about a specific implementation process of the encoding apparatus, refer to the method embodiment. Details are not described herein again.

Figure 17:
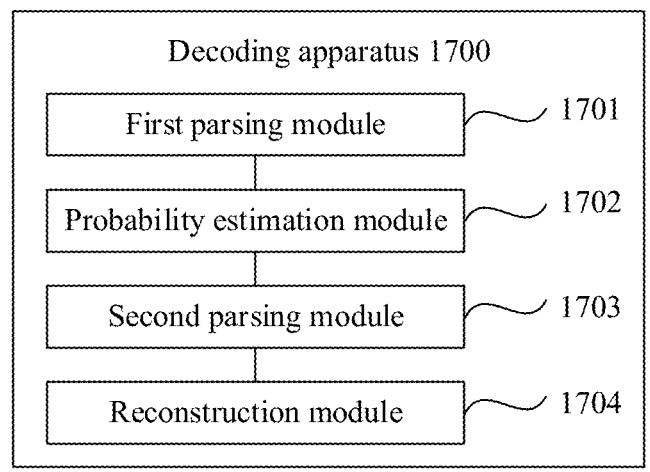
FIG. 17 is a diagram of a structure of another decoding apparatus according to an embodiment of this disclosure.

FIG. 17 is a diagram of a structure of a decoding apparatus 1700 according to an embodiment of this disclosure. The decoding apparatus 1700 may be implemented as a part of a decoder-side device or an entire decoder-side device by using software, hardware, or a combination thereof. The decoder-side device may be any decoder side shown in FIG. 1 to FIG. 3. Refer to FIG. 17. The apparatus 1700 includes a first parsing module 1701, a probability estimation module 1702, a second parsing module 1703, and a reconstruction module 1704.

The first parsing module 1701 is configured to parse a bitstream to obtain a first hyperprior feature of a to-be-decoded image.

The probability estimation module 1702 is configured to determine a second probability distribution parameter based on the first hyperprior feature via a second probability distribution estimation network, where a network parameter of the second probability distribution estimation network is obtained based on a network parameter of a first probability distribution estimation network and a first quantization step, and the first probability distribution estimation network is used to determine probability distribution of an unquantized image feature.

The second parsing module 1703 is configured to parse the bitstream based on the second probability distribution parameter to obtain a first image feature of the image.

The reconstruction module 1704 is configured to inversely quantize the first image feature based on the first quantization step to reconstruct the image.

Optionally, the second probability distribution estimation network is obtained by multiplying a network parameter of a last layer in the first probability distribution estimation network by the first quantization step.

Optionally, the last layer in the first probability distribution estimation network is a convolutional layer, and network parameters of the convolutional layer include a weight and an offset.

Optionally, the first image feature is an image feature obtained by quantizing a second image feature of the image based on the first quantization step.

Optionally, the reconstruction module 1704 includes: an inverse quantization submodule, configured to inversely quantize the first image feature based on the first quantization step to obtain a third image feature of the image; and a reconstruction submodule, configured to reconstruct the image based on the third image feature.

In a decoding process in this embodiment of this disclosure, the second probability distribution parameter is directly obtained via the second probability distribution estimation network. The second probability distribution estimation network is obtained by processing the network parameter in the first probability distribution estimation network based on the first quantization step, and the first probability distribution estimation network is used to determine a probability distribution parameter of the unquantized image feature. It can be learned that only the first probability distribution estimation network (for determining the probability distribution parameter of the unquantized image feature) needs to be obtained through training in this solution. Even in a multi-bit-rate scenario, a numerical range of the unquantized image feature is stable and is not affected by a quantization step, in other words, an input numerical range of the first probability distribution estimation network does not change with the bitstream. Therefore, training on the first probability distribution estimation network is less difficult and stable, and the first probability distribution estimation network with good performance can be obtained through training. This helps improve encoding and decoding performance.

It should be noted that, during decoding by the decoding apparatus provided in the foregoing embodiment, division into the foregoing functional modules is merely used as an example for description. In actual application, the foregoing functions may be allocated to different functional modules and implemented based on a requirement. To be specific, an internal structure of the apparatus is divided into different functional modules to implement all or some of the functions described above. In addition, the decoding apparatus provided in the foregoing embodiment and the decoding method embodiment belong to a same concept. For details about a specific implementation process of the decoding apparatus, refer to the method embodiment. Details are not described herein again.

Figure 18:
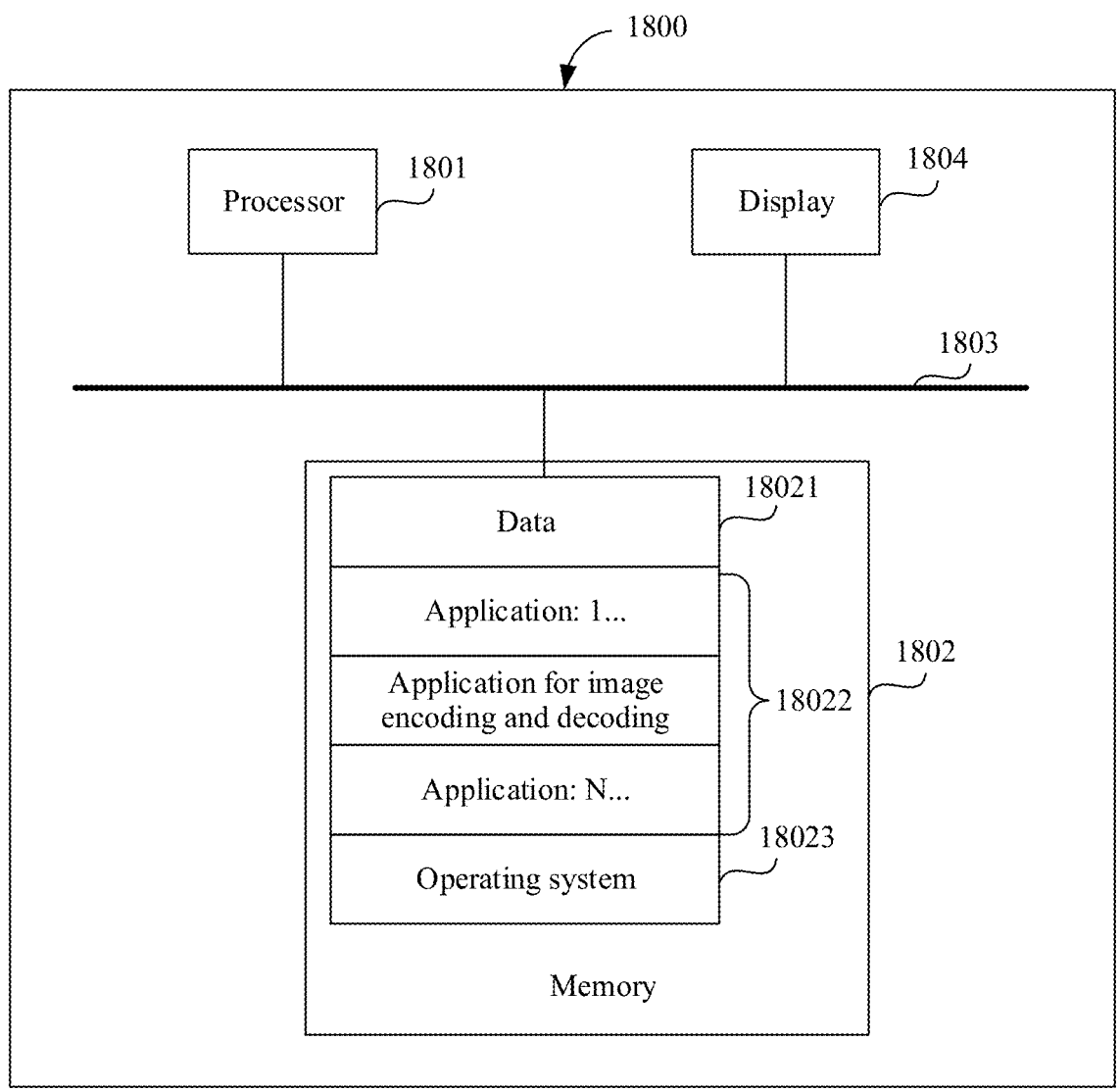
FIG. 18 is a block diagram of an encoding and decoding apparatus according to an embodiment of this disclosure.

FIG. 18 is a block diagram of an encoding and decoding apparatus 1800 according to an embodiment of this disclosure. The encoding and decoding apparatus 1800 may include a processor 1801, a memory 1802, and a bus system 1803. The processor 1801 and the memory 1802 are connected through the bus system 1803. The memory 1802 is configured to store instructions. The processor 1801 is configured to execute the instructions stored in the memory 1802, to perform the encoding or decoding methods described in embodiments of this disclosure. To avoid repetition, details are not described herein again.

In this embodiment of this disclosure, the processor 1801 may be a central processing unit (CPU), or the processor 1801 may be another general-purpose processor, a DSP, an ASIC, an FPGA or another programmable logic device, a discrete gate or a transistor logic device, a discrete hardware component, or the like. The general-purpose processor may be a microprocessor, or the processor may be any other processor or the like.

The memory 1802 may include a ROM device or a RAM device. Any another suitable type of storage device may also be used as the memory 1802. The memory 1802 may include code and data 18021 accessed by the processor 1801 through the bus 1803. The memory 1802 may further include an operating system 18023 and an application 18022. The application 18022 includes at least one program that allows the processor 1801 to perform the encoding or decoding methods described in embodiments of this disclosure. For example, the application 18022 may include applications 1 to N, and further include an encoding or decoding application (referred to as a coding application) for performing the encoding or decoding methods described in embodiments of this disclosure.

In addition to a data bus, the bus system 1803 may further include a power bus, a control bus, a status signal bus, and the like. However, for clear description, various types of buses in the figure are marked as the bus system 1803.

Optionally, the encoding and decoding apparatus 1800 may further include one or more output devices, such as a display 1804. In an example, the display 1804 may be a touch-sensitive display that combines the display with a touch-sensitive unit operable to sense a touch input. The display 1804 may be connected to the processor 1801 through the bus 1803.

It should be noted that the encoding and decoding apparatus 1800 may perform the encoding method in embodiments of this disclosure or the decoding method in embodiments of this disclosure.

A person skilled in the art can appreciate that functions described with reference to various illustrative logical blocks, modules, and algorithm steps disclosed and described herein may be implemented by hardware, software, firmware, or any combination thereof. If implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communication medium that facilitates transmission of a computer program from one place to another place (for example, according to a communication protocol). In this manner, the computer-readable medium may generally correspond to: (1) a non-transitory tangible computer-readable storage medium, or (2) a communication medium such as a signal or a carrier. The data storage medium may be any usable medium that can be accessed by one or more computers or one or more processors to retrieve instructions, code, and/or data structures for implementing the technologies described in this disclosure. A computer program product may include a computer-readable medium.

By way of example and not limitation, such computer-readable storage media may include a RAM, a ROM, an EEPROM, a CD-ROM or another optical disc storage apparatus, a magnetic disk storage apparatus or another magnetic storage apparatus, a flash memory, or any other medium that can be used to store required program code in a form of instructions or data structures and that can be accessed by a computer. In addition, any connection is properly referred to as a computer-readable medium. For example, if an instruction is transmitted from a website, a server, or another remote source through a coaxial cable, an optical fiber, a twisted pair, a DSL, or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a DVD, and a BLU-RAY disc. The disks usually reproduce data magnetically, and the discs reproduce data optically through lasers. Combinations of the foregoing items should also be included within a scope of the computer-readable medium.

An instruction may be executed by one or more processors such as one or more DSPs, a general-purpose microprocessor, an ASIC, an FPGA, or an equivalent integrated circuit or discrete logic circuit. Therefore, the term "processor" used in this specification may refer to the foregoing structure, or any other structure that may be applied to implementation of the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be completely implemented in one or more circuits or logic elements. In an example, various illustrative logic blocks, units, and modules in the encoder 100 and the decoder 200 may be understood as corresponding circuit devices or logic elements.

Technologies in embodiments of this disclosure may be implemented in various apparatuses or devices, including a wireless handset, an integrated circuit (IC), or a set of ICs (for example, a chip set). Various components, modules, or units are described in embodiments of this disclosure to emphasize functional aspects of apparatuses configured to perform disclosed technologies, but do not necessarily need to be implemented by different hardware units. Actually, as described above, various units may be combined with appropriate software and/or firmware into a codec hardware unit, or provided by an interoperable hardware unit (including the one or more processors described above).

In other words, all or a part of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer instructions are loaded and executed on the computer, the procedures or functions according to embodiments of this disclosure are all or partially generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, a computer, a server or a data center to another website, computer, server or data center in a wired (for example, a coaxial cable, an optical fiber, or a DSL) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like. It should be noted that the computer-readable storage medium mentioned in embodiments of this disclosure may be a non-volatile storage medium, that is, may be a non-transitory storage medium.

It should be understood that "at least one" mentioned in this specification refers to one or more, and "a plurality of" refers to two or more. In the descriptions of embodiments of this disclosure, "/" means "or" unless otherwise specified. For example, A/B may represent A or B. In this specification, "and/or" describes only an association relationship between associated objects and represents that three relationships may exist. For example, A and/or B may represent the following three cases. Only A exists, both A and B exist, and only B exists. In addition, to clearly describe the technical solutions in embodiments of this disclosure, terms such as "first" and "second" are used in embodiments of this disclosure to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

It should be noted that information (including but not limited to user equipment information, personal information of a user, and the like), data (including but not limited to data used for analysis, stored data, displayed data, and the like) and signals in embodiments of this disclosure are used under authorization by the user or full authorization by all parties, and capturing, use, and processing of related data need to conform to related laws, regulations, and standards of related countries and regions. For example, the images and the videos in embodiments of this disclosure are obtained under full authorization.

The foregoing descriptions are merely example embodiments of this disclosure, but are not intended to limit this disclosure. Any modification, equivalent replacement, or improvement made without departing from the spirit and principle of this disclosure should fall within the protection scope of this disclosure.

What is claimed is:

1. A method, comprising:
   quantizing, based on a first quantization step, a second image feature of a to-be-encoded image to obtain a first image feature of the to-be-encoded image;
   encoding a first hyperprior feature of the second image feature into a bitstream;
   determining, based on the first hyperprior feature and via a probability distribution estimation network, a first probability distribution parameter;
   quantizing, based on the first quantization step, the first probability distribution parameter to obtain a second probability distribution parameter; and
   encoding, based on the second probability distribution parameter, the first image feature into the bitstream.

2. The method of claim 1, further comprising inputting the second image feature into a hyper encoder network to obtain the first hyperprior feature.

3. The method of claim 1, further comprising:
   inversely quantizing, based on the first quantization step, the first image feature to obtain a third image feature of the to-be-encoded image; and
   inputting the third image feature into a hyper encoder network to obtain the first hyperprior feature.

4. The method of claim 1, wherein determining the first probability distribution parameter comprises:
   inversely quantizing, based on the first quantization step, the first image feature to obtain a third image feature of the to-be-encoded image;
   inputting the third image feature into a context network to obtain a context feature of the third image feature;
   determining, based on the first hyperprior feature, a first prior feature; and
   inputting the first prior feature and the context feature into the probability distribution estimation network to obtain the first probability distribution parameter.

5. The method of claim 1, wherein determining the first probability distribution parameter comprises:
   inputting the first image feature into a context network to obtain a context feature of the first image feature;
   determining, based on the first hyperprior feature, a first prior feature;
   quantizing, based on a second quantization step, the first prior feature to obtain a second prior feature; and
   inputting the second prior feature and the context feature into the probability distribution estimation network to obtain the first probability distribution parameter.

6. A method, comprising:
   parsing a bitstream to obtain a first hyperprior feature of a to-be-decoded image;
   determining, based on the first hyperprior feature and via a probability distribution estimation network, a first probability distribution parameter that represents a probability distribution of an unquantized image feature of the to-be-decoded image;
   quantizing, based on a first quantization step, the first probability distribution parameter to obtain a second probability distribution parameter;
   parsing, based on the second probability distribution parameter, the bitstream to obtain a first image feature of the to-be-decoded image; and
   inversely quantizing, based on the first quantization step, the first image feature to reconstruct the to-be-decoded image.

7. The method of claim 6, wherein the first image feature is based on quantization on a second image feature of the to-be-decoded image using a first quantization step.

8. The method of claim 6, wherein inversely quantizing the first image feature comprises:
   inversely quantizing, based on the first quantization step, the first image feature to obtain a third image feature of the to-be-decoded image; and
   reconstructing, based on the third image feature, the to-be-decoded image.

9. The method of claim 6, wherein the first probability distribution parameter comprises third probability distribution parameters of a plurality of feature points, wherein the first hyperprior feature comprises second hyperprior features of the plurality of feature points, and wherein determining the first probability distribution parameter comprises:
   performing the following operations on a first feature point to determine a fourth probability distribution parameter of the first feature point, wherein the first feature point is any one of the plurality of feature points:
      determining, based on second image features of decoded feature points in the first image feature, a context feature of the first feature point;
      determining, based on a hyperprior feature of the first feature point, a first prior feature of the first feature point; and
      determining, based on the first prior feature, based on the context feature, and via the probability distribution estimation network, the fourth probability distribution parameter.

10. The method of claim 9, wherein determining the context feature comprises:
    determining, from the decoded feature points, a surrounding feature point of the first feature point;
    inversely quantizing, based on the first quantization step, a third image feature of the surrounding feature point in the first image feature to obtain a surrounding feature of the first feature point; and
    inputting the surrounding feature into a context network to obtain the context feature, and
    wherein determining the fourth probability distribution parameter comprises inputting the first prior feature and the context feature into the probability distribution estimation network to obtain the fourth probability distribution parameter.

11. The method of claim 9, wherein determining the context feature comprises:
    determining, from the decoded feature points, a surrounding feature point of the first feature point; and inputting a third image feature of the surrounding feature point into a context network to obtain the context feature, and wherein determining the fourth probability distribution parameter comprises:

quantizing, based on a second quantization step, the first prior feature to obtain a second prior feature of the first feature point; and inputting the second prior feature and the context feature into the probability distribution estimation network to obtain the fourth probability distribution parameter.

12. An apparatus, comprising:

a memory configured to store instructions; and one or more processors coupled to the memory and configured to execute the instructions to:

parse a bitstream to obtain a first hyperprior feature of a to-be-decoded image;

determine, based on the first hyperprior feature and via a probability distribution estimation network, a first probability distribution parameter that represents a probability distribution of an unquantized image feature of the to-be-decoded image;

quantize, based on a first quantization step, the first probability distribution parameter to obtain a second probability distribution parameter;

parse, based on the second probability distribution parameter, the bitstream to obtain a first image feature of the to-be-decoded image; and inversely quantize, based on the first quantization step, the first image feature to reconstruct the to-be-decoded image.

13. The apparatus of claim 12, wherein the first image feature is from quantizing, based on the first quantization step, a second image feature.

14. The apparatus of claim 12, wherein the one or more processors are further configured to execute the instructions to:

inversely quantize, based on the first quantization step, to obtain a third image feature of the to-be-decoded image; and reconstruct, based on the third image feature, the to-be-decoded image.

15. A computer program product comprising instructions that are stored on a non-transitory computer-readable storage medium and that, when executed by one or more processors, cause an apparatus to:

quantize, based on a first quantization step, a second image feature of a to-be-encoded image to obtain a first image feature of the to-be-encoded image;

encode a first hyperprior feature of the second image feature into a bitstream;

determine, based on the first hyperprior feature and via a probability distribution estimation network, a first probability distribution parameter;

quantize, based on the first quantization step, the first probability distribution parameter to obtain a second probability distribution parameter; and encode, based on the second probability distribution parameter, the first image feature into the bitstream.

16. The computer program product of claim 15, wherein the one or more processors are further configured to execute the instructions to input the second image feature into a hyper encoder network to obtain the first hyperprior feature.

17. The computer program product of claim 15, wherein the one or more processors are further configured to execute the instructions to:

inversely quantize, based on the first quantization step, the first image feature to obtain a third image feature of the to-be-encoded image; and input the third image feature into a hyper encoder network to obtain the first hyperprior feature.

18. The computer program product of claim 15, wherein the one or more processors are further configured to execute the instructions to:

inversely quantize, based on the first quantization step, the first image feature to obtain a third image feature;

input the third image feature into a context network to obtain a context feature of the third image feature;

determine, based on the first hyperprior feature, a first prior feature; and input the first prior feature and the context feature into the probability distribution estimation network to obtain the first probability distribution parameter.

19. The computer program product of claim 15, wherein the one or more processors are further configured to execute the instructions to:

input the first image feature into a context network to obtain a context feature of the first image feature;

determine, based on the first hyperprior feature, a first prior feature;

quantize, based on a second quantization step, the first prior feature to obtain a second prior feature; and input the second prior feature and the context feature into the probability distribution estimation network to obtain the first probability distribution parameter.

20. The computer program product of claim 15, wherein the one or more processors are further configured to execute the instructions to receive, through an interface with an image content provider, the to-be-encoded image.

* * * * *